(12) United States Patent
Frankel et al.

(10) Patent No.: US 8,374,716 B1
(45) Date of Patent: Feb. 12, 2013

(54) SYSTEM AND METHOD FOR RECONFIGURABLE FANS

(75) Inventors: Scott Frankel, Gilbert, AZ (US); Eric Hardt, Mesa, AZ (US); Masaaki Matsubara, Yonago (JP); Nigel Strike, Phoenix, AZ (US); Yukihiro Tanada, Tempe, AZ (US)

(73) Assignee: Minebea Co., Ltd., Nagano (JP)

( * ) Notice: Subject to any disclaimer, the term of this patent is extended or adjusted under 35 U.S.C. 154(b) by 1326 days.

(21) Appl. No.: 12/104,417

(22) Filed: Apr. 16, 2008

(51) Int. Cl.
*G06F 19/00* (2011.01)

(52) U.S. Cl. .................... 700/170; 388/804

(58) Field of Classification Search .............. 700/17, 700/83, 170; 318/400.01, 400.09, 400.16, 318/400.17, 400.29, 400.42, 711, 808, 811; 388/804, 805, 8–9, 809
See application file for complete search history.

(56) References Cited

U.S. PATENT DOCUMENTS

| | | | |
|---|---|---|---|
| 3,710,215 A * | 1/1973 | Johnston | 318/801 |
| 5,977,737 A * | 11/1999 | Labriola, II | 318/599 |
| 6,611,117 B1 | 8/2003 | Hardt | |
| 6,819,069 B2 | 11/2004 | Hornberger et al. | |
| 6,931,306 B2 | 8/2005 | Frankel et al. | |
| 7,117,054 B2 | 10/2006 | Frankel et al. | |
| 2004/0036427 A1* | 2/2004 | Mitchell | 318/254 |
| 2007/0156292 A1 | 7/2007 | Frankel et al. | |

\* cited by examiner

*Primary Examiner* — Jeffrey A Gaffin
*Assistant Examiner* — Chad Rapp
(74) *Attorney, Agent, or Firm* — Fountainhead Law Group P.C.

(57) ABSTRACT

A computer program product stored in a computing device has a processor and a communication interface to determine cooling specifications of a remote housing. The computer program product includes a machine-readable storage medium and machine-readable program code, stored on the machine-readable storage medium. The machine readable program code includes instructions, which when executed, to cause the processor to interact with a user to obtain fan motor operating parameters and conditions. Motor operation is then controlled in accordance with the user-provided operating parameters and conditions.

24 Claims, 21 Drawing Sheets

FIG. 6

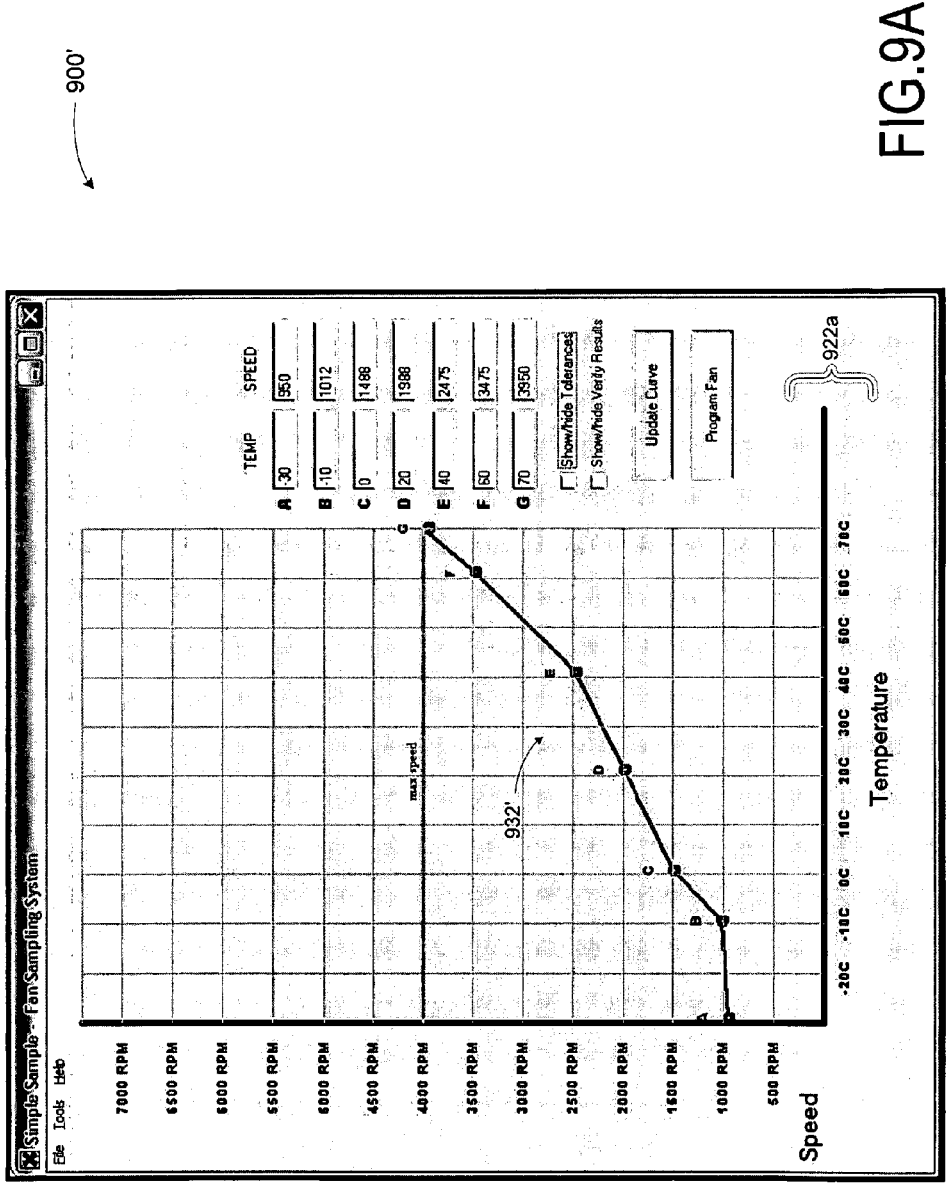

1% duty cycle    100% duty cycle    41% duty cycle

```
 :
 :
const int PWM_array[]={79, 79, 79, 79, 79, 79, 83, 83, 83, 83, 83, 83, 83, 83, 86, 86, 86, 86, 86, 86, 86, 90, 90,
90, 90, 95, 95, 95, 95, 99, 99, 99, 99, 104, 104, 104, 104, 104, 109, 109, 114, 114, 116, 119, 125, 125, 131, 137,
143, 149, 149, 155, 162, 168, 174, 174, 180, 186, 193, 199, 199, 205, 212, 218, 225, 225, 231, 238, 244, 251,
251, 264, 271, 278, 285, 292, 306, 314, 320, 329, 337, 352, 369, 378, 395, 404, 424, 444, 455, 477, 488, 513,
539, 552, 581, 612, 622, 656, 675, 714, 756};
char index = 0;
char LowspeedAlarm_enable = 1;
int lowspdtrip=2000;
char LowspeedAlarmDelay=3;
char locked_alarm=3;
char Alarm_lowpass=1;
char startup=3;
char locked_interval=10;
char Open_loop_flag=1;
char calibrate= 0;
char normalOperation=1;
char verify=0;
 :
 :
```

System configuration

Windows based software

PICkit II Programmer

Microcontroller fan

```
const int Duty_array[]={938, 524, 366, 315, 274, 251, 232, 217, 205, 194, 185, 177, 170, 161, 156, 150, 146, 142, 138, 134, 131,
128, 126, 123, 120, 118, 116, 114, 112, 110, 108, 106, 105, 104, 102, 100, 99, 98, 96, 95, 94, 93, 92, 91, 90, 89, 88, 87, 86, 86, 84,
84, 84, 84, 86, 92, 88, 89, 90, 91, 92, 93, 94, 95, 96, 98, 99, 100, 102, 104, 105, 106, 108, 110, 112, 114, 116, 118, 120,
123, 126, 128, 131, 134, 138, 142, 146, 150, 156, 161, 166, 174, 181, 190, 196, 196, 196, 196};

const int numberpulses_array[]={1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 200, 800, 800, 800, 800, 1, 1, 1, 1, 1, 1, 1, 1, 1, 1, 1, 1, 1, 1, 1, 1, 1, 1, 1, 1, 1,
1, 1, 1, 1, 1, 1, 1, 1, 100, 1, 1, 1, 1};

const int freq_array[]={1538, 971, 704, 606, 538, 493, 455, 426, 402, 380, 362, 347, 333, 322, 311, 301, 292, 283, 276, 269, 262,
256, 251, 246, 241, 236, 232, 228, 224, 220, 216, 213, 210, 207, 204, 201, 198, 196, 193, 190, 188, 186, 184, 182, 180, 178, 176,
174, 172, 171, 169, 167, 167, 167, 169, 171, 172, 183, 176, 178, 180, 182, 184, 186, 188, 190, 193, 196, 198, 201, 204, 207, 210,
213, 216, 220, 224, 228, 232, 236, 241, 246, 251, 256, 262, 269, 276, 283, 292, 301, 311, 322, 333, 347, 362, 380, 392, 392, 392,
392};

const int volt_array[]={63, 63, 63, 63, 63, 63, 63, 63, 63, 63, 63, 63, 63, 63, 63, 63, 63, 63, 63, 63, 63, 63, 63, 63, 63, 63, 63,
63, 63, 63, 63, 63, 63, 63, 63, 63, 63, 63, 63, 63, 63, 63, 63, 63, 63, 63, 63, 63, 63, 63, 63, 63, 63, 63, 63, 63, 63, 63, 63,
63, 63, 63, 63, 63, 63, 63, 63, 63, 63, 63, 63, 63, 63, 63, 63, 63, 63, 63, 63, 63, 63, 63, 63, 63, 63, 63, 63, 63, 63, 63, 63,
63, 63};
```

FIG. 16

SYSTEM AND METHOD FOR RECONFIGURABLE FANS

CROSS-REFERENCES TO RELATED APPLICATIONS

This application is related to U.S. Pat. No. 6,611,117, issued Aug. 26, 2003 U.S. Pat. No. 6,931,306, issued Aug. 16, 2005, U.S. Pat. No. 7,117,054, issued Oct. 3, 2006, and U.S. application Ser. No. 11/526,092, filed Sep. 22, 2006, all of which are incorporated herein in their entirety by reference for all purposes.

BACKGROUND OF THE INVENTION

The present invention relates to cooling fans. More particularly, the present invention relates to intelligent cooling fans for use in electronic systems and for designing cooling solutions for electronic systems.

In electronic systems, such as computer systems, cooling fans play an important role in maintaining their operational capabilities. The inability to remove excessive heat from electronic systems may lead to permanent damage of the system. Because of the complexity of existing electronic systems, cooling fans having added functionalities other than just providing cooling air, such as the ability to control the speed of a fan, the ability to monitor a tachometer pulse on a fan to determine instantaneous fan speed, and the ability to detect if a fan has failed or is slower than its preset speed, are required. Although these functionalities exist in some cooling fans today, there is no standard design or protocol that is available to control cooling fans produced by different manufacturers. Moreover, in order to implement these cooling fans within a system, specialized printed circuit assemblies (PCAs), also called controller cards, are required to be designed so as to provide signals that a fan can understand and also to receive and provide signals to the system in a form that is interpretable by the electronics of the system.

If one desires additional functionality, such as the ability for the fans to compensate for other failed fans by increasing speed, the ability for fans to notify external hardware that there is a problem, or the ability for fans to increase speed in response to increased system temperatures, a specialized PCA or controller card is also required. The PCA or controller card is designed and built to be capable of detecting a fan failure, notifying the system that a fan has failed, and adjusting the speeds of the other fans in the system. The design and manufacture of PCAs and controller cards involve a great deal of engineering time and resources, which ultimately add to the cost of the overall system utilizing the cooling fan(s).

Designing cooling solutions for new systems is also a time-consuming process for the thermal design engineer. Typically, the PCA or controller card is required to be designed and built for controlling the fan speed and other functionality, such as failure detection and alarm settings. Often times, the design and construction of multiple control cards are required so as to test them in real world applications to obtain the right combination of fans, fan speeds, alarm settings, etc. The multiple iterations of installing sample fans in a system, determining the adequate fan speeds and power required, and testing the fans in the system, for example, are costly and inefficient.

Another concern with conventional techniques for designing cooling fans is the ability to easily develop pulse trains for different motor and motor configurations. As explained above, existing techniques have been the use of custom ICs, which cannot be changed once designed.

Another concern involving conventional cooling fans, and in particular, direct current (DC) brushless cooling fans, is that they change speeds depending on the applied input voltage. As the input voltage is increased, the fans speed up and use more power. When input voltage is decreased, the fans decrease in speed and provide less cooling. Many typical applications have a voltage range that may vary between 24 to 74 volts. Accordingly, a system designer is charged with maintaining a constant cooling during these wide voltage swings. Accordingly, a voltage regulating power supply is usually installed in a system to keep the voltage to the fans constant. However, having to install a voltage regulating power supply adds additional complexity and cost to the overall system as well.

BRIEF SUMMARY OF THE INVENTION

A method and system according to the present invention provides a user interface to facilitate the configuration of a motor. In particular, a user interface is provided to allow a user to specify configuration data that is then used to generate the commutation signal for energizing the coil(s) of a motor. In a particular embodiment, the configuration data is used to control a microcontroller to produce appropriate commutation signals for driving a motor. Particular embodiments include motors for fans ("fan motors") and vibration motors.

BRIEF DESCRIPTION OF THE DRAWINGS

FIG. 6 illustrates a sample screen of advanced functions of a fan controller user interface according to an embodiment of the present invention;

FIGS. 9, 9A-9C illustrate sample screens of a fan controller user interface according to an embodiment of the present invention;

FIG. 16 shows an example of a header file containing operating parameters for the fan motor generated in accordance with an embodiment of the present invention;

DETAILED DESCRIPTION OF THE INVENTION

Figure 1:
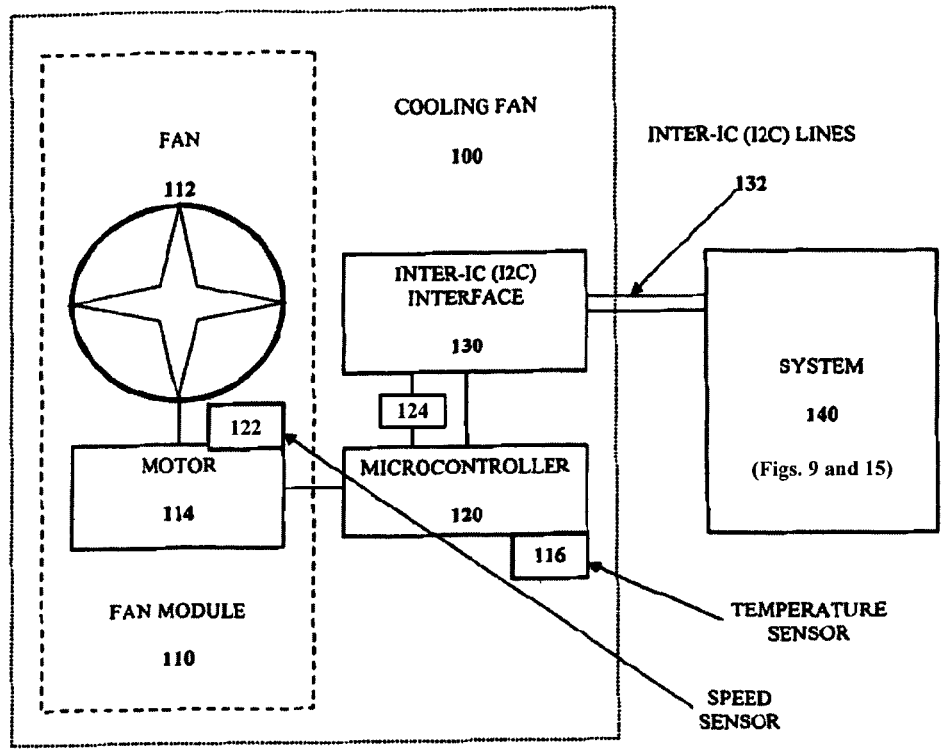
FIG. 1 illustrates a cooling fan solution according to an embodiment of the present invention.

FIG. 1 illustrates a cooling fan solution according to an embodiment of the present invention. The cooling fan 100 includes a fan module 110, which has a fan 112 (including fan blades) and a motor 114 rotatably coupled to the fan 112 to drive the fan 112. A microcontroller 120, such as an 18-pin PIC16C717 microcontroller device manufactured by Microchip Technology, Inc., is in direct communication with the fan module 110, and specifically, the motor 114. Any suitable microcontroller or processor may be utilized, though. The microcontroller 120 is preferably fixed internally within the cooling fan 100.

A bus interface, such as the Inter-IC (I2C) ("I2C-Bus Specification", Version 2.1, January 2000, from Philips Semiconductors) bus interface 130 is in communication with the microcontroller 120. The bus interface 130 facilitates transfer of data to and from the microcontroller 120. In another embodiment, a programmable non-volatile memory 124 can be provided to store data that can read by the microcontroller 120. An example of a programmable non-volatile memory is an EPROM (electrically erasable programmable read-only memory), and other conventionally known memories. An embodiment that utilizes such a memory is discussed below.

The bus interface 130 may be interconnected by bus lines 132, such as I2C bus lines, to a system 140. The I2C bus lines 132 has two lines: a data (SDA) line and a clock (SCL) line. Inter-IC (I2C) may be accessed serially so that each individual device utilizing the I2C protocol has a specific identification (ID), but may all be connected to the same communication line(s) or bus(es) (i.e., it may be connected as a parallel bus). Inter-IC (I2C) is a useful protocol because it is familiar to thermal design engineers who utilize cooling fans in their system designs, and a fair number of digital logic devices utilize the I2C protocol. However, any other bus interface systems and protocols may also be utilized. For example, the Controller-Area Network (CAN) protocol (Controller-Area Network (CAN) Specification, version 2.0, 1991, Robert Bosch GmbH, Stuttgart, Germany), utilized in the automotive industry, may also be utilized with the bus interface 130 according to an embodiment of the present invention.

Besides the ability for a fan customer or thermal design engineer to control the fan speed, monitor a tachometer pulse on the fan to determine instantaneous fan speed, and detect if the fan has failed or is slower than a preset speed, additional functionality, such as the ability to electronically read the part number of a cooling fan 100, the ability to electronically determine the fan manufacturer, and the ability to electronically read the manufacturing date, is particularly desirable. Because of the concern that various fan manufacturers may have different methods of controlling fan speed, or providing alarm or tachometer signals, being able to easily obtain cooling fan 100 information such as the part number, the fan manufacturer, and the manufacturing date quickly aids in the design and repair of a cooling solution.

According to an embodiment of the present invention, the microcontroller 120 is programmed with program code that enables the microcontroller 120 to read byte communications provided by a system or device 140 that utilizes, for example, the I2C protocol. In a particular embodiment of the present invention, the microcontroller 120 includes a program memory into which the program code is stored. The PIC 16C717 microcontroller, for example, is capable of handling 14-bit words and has a capacity of 2 kilobytes. The program or instruction code is programmed only once into the microcontroller 120 at the factory, and it is not re-programmable or re-writeable by an end user or cooling fan customer. The PIC 16C717 microcontroller, for example, also includes a small data memory, or "scratch pad memory", having a capacity of 256 bytes available to the microcontroller 120 to conduct its operations. The data memory of the microcontroller 120 is volatile and does not store any programming or instructions, but rather it is only a working memory.

The program code (such as code written in the "C" programming language) in the microcontroller 120 may include the cooling fan's 100 part number, manufacturer, and date of manufacture so that when the microcontroller 120 receives a command, e.g., from the host system/device 140, to output such data to a system or device 140 connected thereto, the microcontroller 120 may readily output the requested data. Useful data other than the cooling fan's 100 part number, manufacturer, and date of manufacture, such as the current (Amps) draw of the fan, may be included as well. The microcontroller 120 may communicate data regarding the cooling fan 100 in, for example, the I2C protocol. By providing a cooling fan 100 that is capable of directly communicating with a system or device 140 utilizing a common protocol, such as the I2C protocol, PCAs or controller cards are not required at all to control or communicate with the cooling fan 100.

Figure 1A:
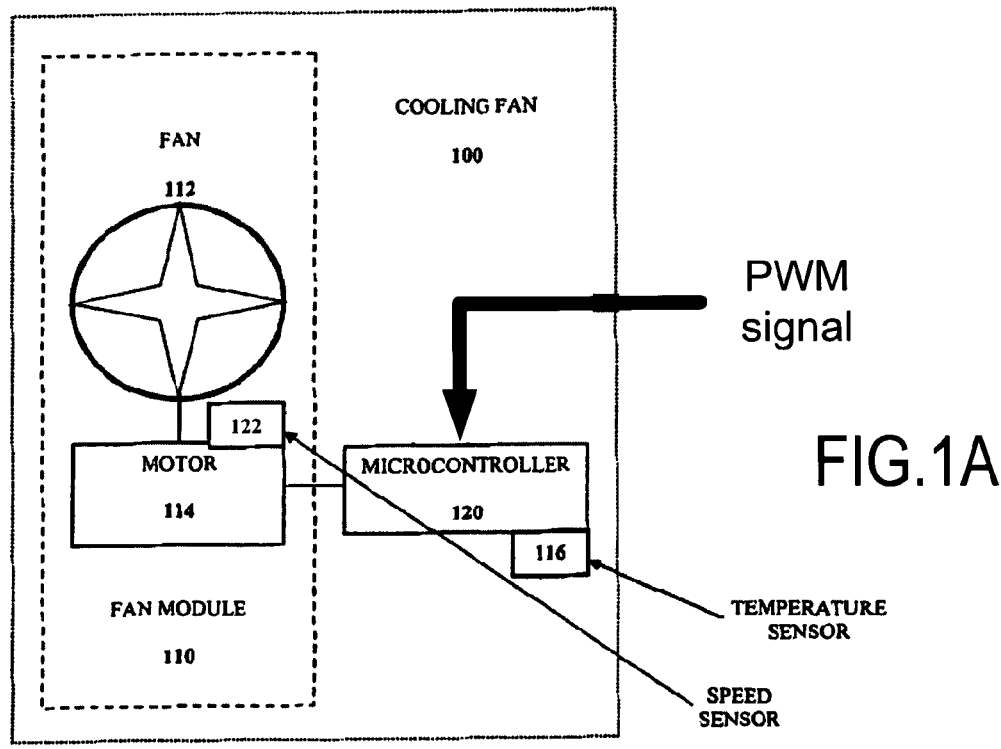
FIG. 1A illustrates PWM control of a cooling fan.

FIG. 1A is provided to illustrate an embodiment in which the cooling fan is controlled by a user-provided pulse-width modulated (PWM) commutation signal. The PWM signal is fed to the microcontroller 120, which then generates a driving commutation signal to drive the MOSFET drivers 350, 360 shown in FIG. 3B and described below. This particular embodiment of the present invention is also discussed in greater detail in U.S. Pat. No. 6,611,117.

Figure 2:
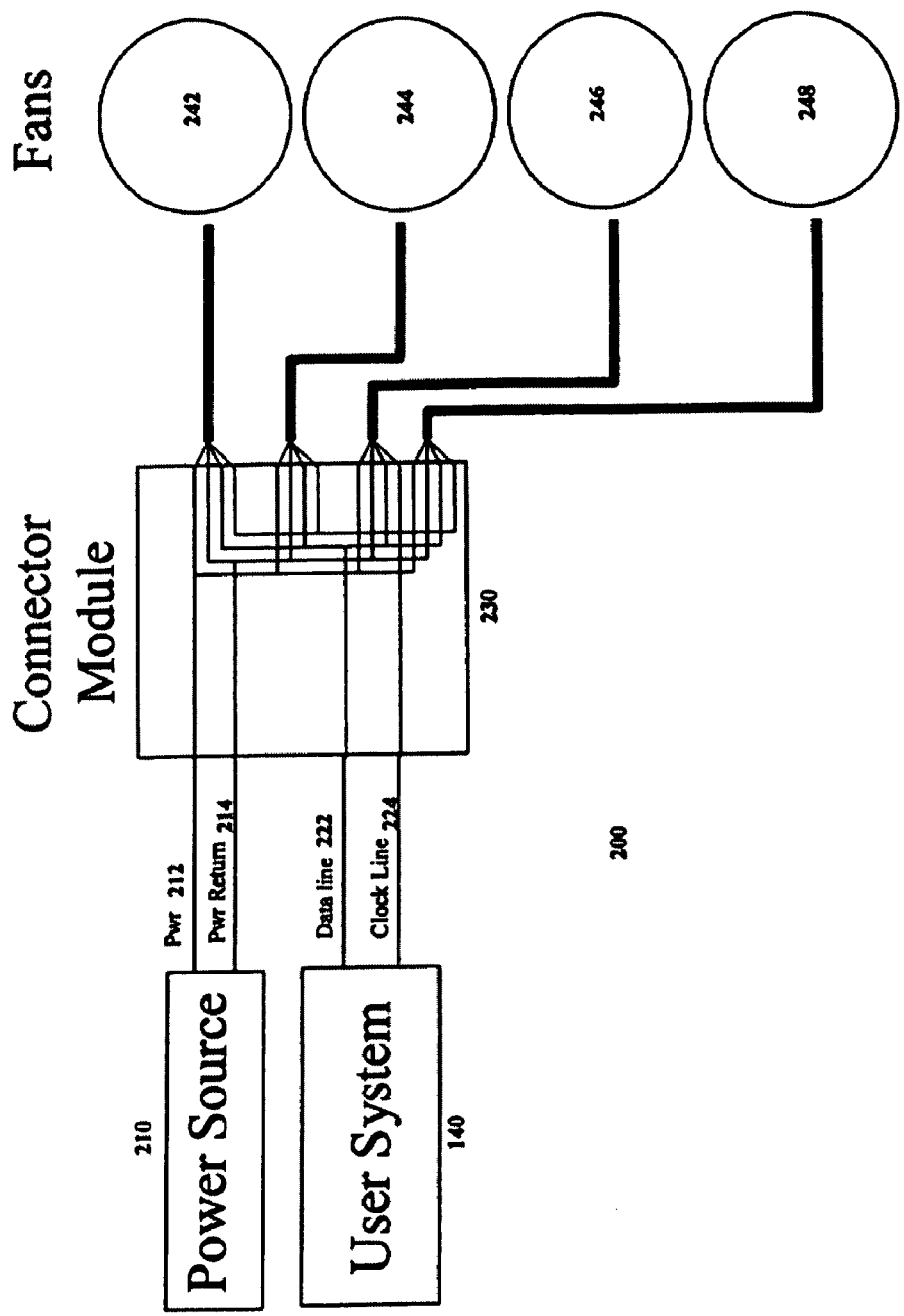
FIG. 2 illustrates an electronic system implementing a plurality of cooling fans according to an embodiment of the present invention.

FIG. 2 illustrates an electronic system implementing a plurality of cooling fans according to an embodiment of the present invention. A plurality of cooling fans 242, 244, 246, 248 are provided within the electronic system 200. Each of the plurality of cooling fans 242, 244, 246, 248 are electrically connected to a connector module 230, which is a line splitter for a power source 210 and a user system/device 140. According to an embodiment of the present invention, the electronic system 200 utilizes the I2C protocol, and the user system/device 140 has communication lines according to the I2C protocol, a data line 222 and a clock line 224 connected to the connector module 230. The connector module 230 in turn splits the data line 222 and the clock line 224 to each one of the plurality of cooling fans 242, 244, 246, 248. Similarly, the power source lines, power line 212 and power return line 214, from the power source 210 are connected to the connector module 230, which in turn splits the power line 212 and the power return line 214 to each one of the plurality of cooling fans 242, 244, 246, 248.

Specific addresses required in all I2C devices may be set externally (by connecting address lines high for a "1", or low for a "0"), or internally during production. The data line 222 and the clock line 224 for each one of the plurality of cooling fans 242, 244, 246, 248 and the user system/device 140 may be connected to each other, or to an internal bus, which enables the user system/device 140, for example, to change the fan speeds of any one of the plurality of cooling fans 242, 244, 246, 248, to detect the fan speeds of any one the plurality of cooling fans 242, 244, 246, 248, to read the part number of any one the plurality of cooling fans 242, 244, 246, 248, etc.

According to another embodiment of the present invention, the microcontroller 120 may be programmed with a program code to enable each cooling fan 100 to detect failures of other cooling fans 242, 244, 246, 248 to notify a user system/device 140 that a fan has failed, or to adjust the speeds of the other fans in the system to compensate. In the prior art, a specialized PCA or controller card was required to be designed and built to provide these functionalities for an electronic system 200 utilizing cooling fans 242, 244, 246, 248. Accordingly, the microcontroller 120 may be programmed with program code so that each cooling fan 242, 244, 246, 248 has the ability to detect and compensate for other failed fans by increasing its fan speed, to notify external hardware 140 that there is a problem, or to increase its fan speed in response to increased system temperatures. By having each of the plurality of cooling fans 242, 244, 246, 248 in communication with each other, added redundancy and functionality may be provided to the overall system 200.

In one particular embodiment, the cooling fans 242, 244, 246, 248 are connected to each other by their communication lines 132 (see FIG. 1), which may be facilitated by a connection to a shared bus. If one of the cooling fans 242, 244, 246, 248 fails, then the failure is detected by the other cooling fans 242, 244, 246, 248. Upon this failure detection, the other cooling fans 242, 244, 246, 248 may be programmed to increase the fan speed to compensate for the decreased airflow due to the failure of one of the cooling fans 242, 244, 246, 248. In a further embodiment, temperature sensors may be implemented utilizing the I2C protocol and connected to the plurality of cooling fans 242, 244, 246, 248 so that each of the cooling fans 242, 244, 246, 248 may communicate directly with the temperature sensors (or through the host system/device 140 if the temperature sensors are not directly connected to the cooling fans 242, 244, 246, 248). Therefore, the plurality of cooling fans 242, 244, 246, 248 may be further programmed to increase fan speeds if an increase in temperature is detected by the temperature sensors, or decrease the fan speed if the temperature drops. In other words, the cooling fans 242, 244, 246, 248 may also be aware of the temperatures detected by the temperature sensors installed within the system and act accordingly. By connecting the cooling fans 242, 244, 246, 248 to each other and placing them into a "multimaster" mode, each cooling fan 242, 244, 246, 248 is in communication with each other and the redundant and failure recovery operations discussed above may be implemented.

By implementing a microcontroller 120 and a bus interface 130 utilizing a standard protocol, such as the I2C protocol, engineers are freed from designing and building a PCA or controller card, the resulting system is not burdened with the additional cost of the controller card, and the cooling fan 100 may be directly added to the existing bus of the customer or design engineer hardware. The cooling fans 242, 244, 246, 248 (see FIG. 2) may be connected to each other, or to a commonly connected printed circuit board (PCB), to greatly simplify cooling solution design and construction. Moreover, the savings of not requiring a specialized PCA or controller card are significant, as they may run three times the cost of the cooling fan itself. In one particular embodiment, the cooling fans 242, 244, 246, 248 may be compatible with, for example, the IBM Specification 18P3640 (October 2001) Type 5 fans.

According to yet another embodiment of the present invention, a cooling fan 100 (see FIG. 1) is provided that is capable of operating at a constant speed even with changing/varying input voltage and/or motor load. As mentioned above, the majority of conventional DC brushless cooling fans change speeds with applied input voltage. As the input voltage is increased, the fans speed up and use more power. When input voltage is decreased, the fans decrease in speed and provide less cooling. Many existing applications have a voltage range that can vary from 24 to 74 volts. The design engineer is charged with maintaining a constant cooling for the system during these wide voltage swings. Typically, the design engineer installs a voltage regulating power supply in the system to keep the voltage to the fans constant. However, providing a voltage regulating power supply adds more complexity and increases the cost to the overall system.

Figure 3A:
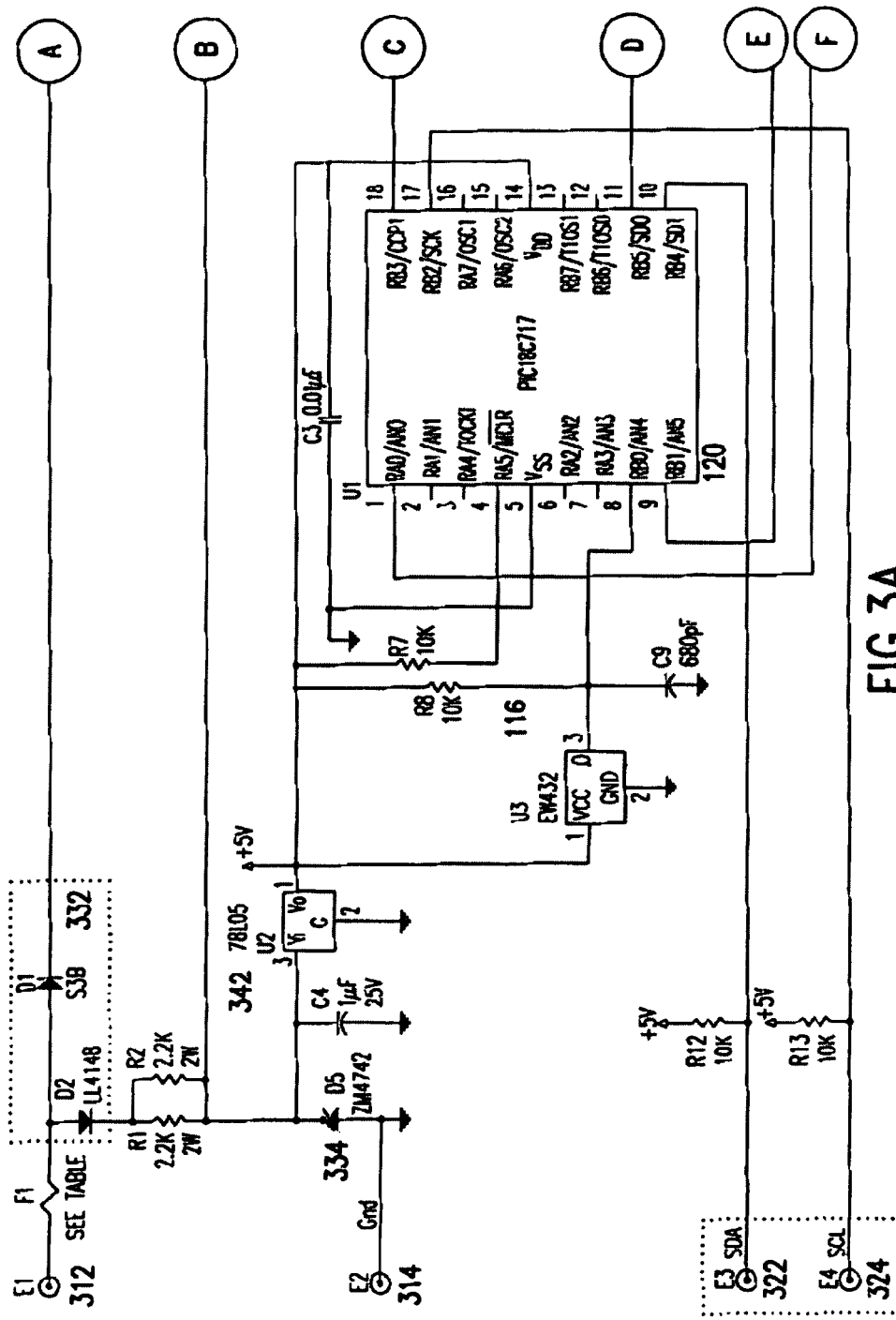
FIGS. 3A and 3B illustrate a schematic circuit diagram for a cooling fan according to an embodiment of the present invention.
Figure 3B:
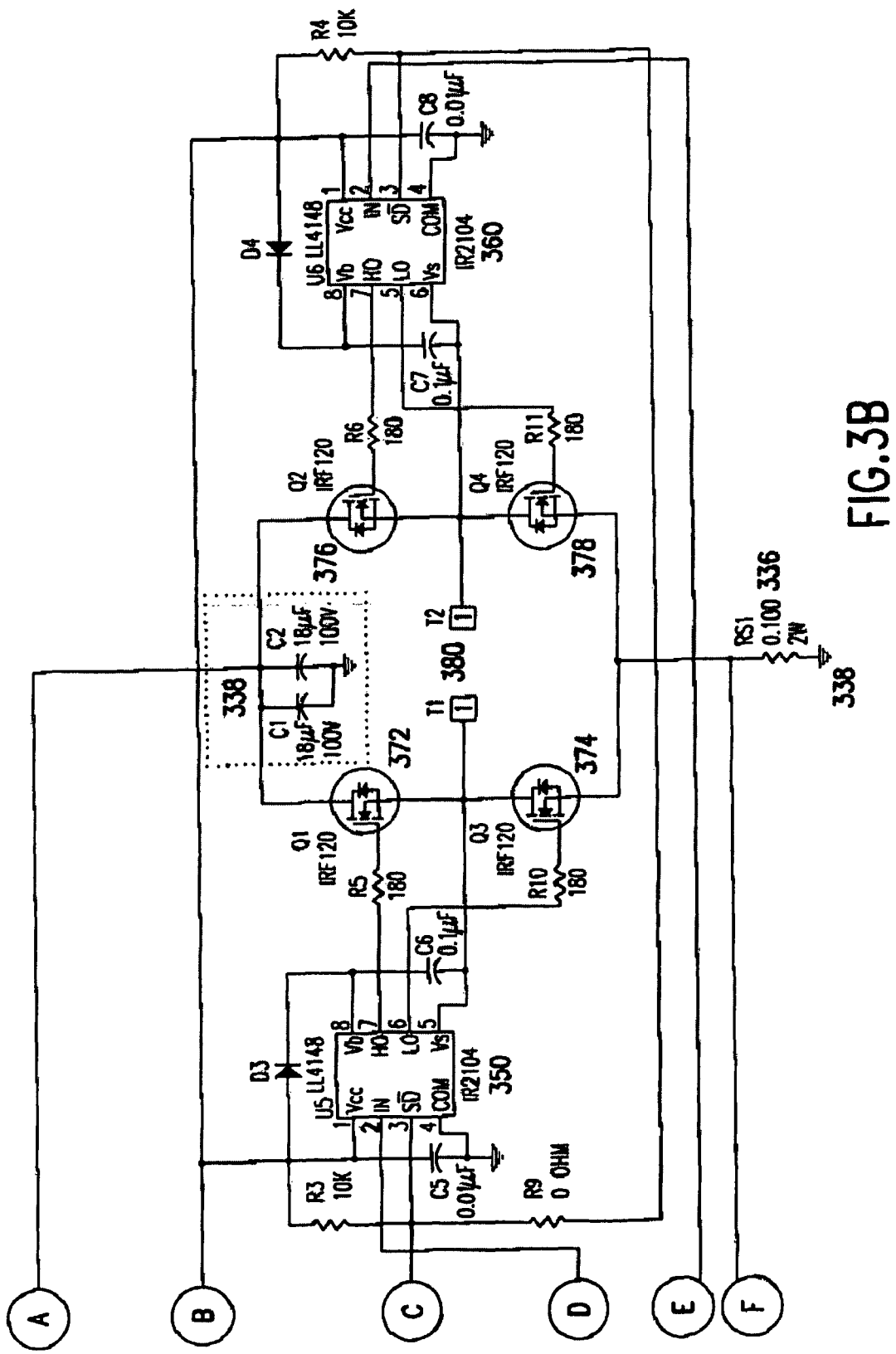

FIGS. 3A and 3B illustrate a schematic circuit diagram for a cooling fan according to an embodiment of the present invention. In an embodiment according to the present invention, the microcontroller 120 has program code having instructions to detect the speed of the cooling fan 100 in real time and maintain that speed, regardless of changes in the input voltage. Referring to FIG. 3A, line E1 312 is the voltage (in) line, while line E2 314 is the voltage return (ground). In a preferred embodiment of the present invention, lines 322 and 324 are Inter-IC (I2C) lines: line 322 being the data line and line 324 being the clock line for communication utilizing the I2C protocol. Typically, in cooling fan applications, the input voltage may be 12 volts, 24 volts, or 48 volts. Diodes D1 and D2 332 provide for reverse polarity protection within the system. Zener diode D5 334 provides a drop in power and regulates the voltage to, for example, 12 volts. A 5V regulator 342 is included to provide regulated 5 volts to the microcontroller 120 and the speed sensor 116 (e.g., the Hall sensor). The Hall sensor 116 provides a digital signal to the microcontroller 120 based on the positions of the stator 380 of the fan motor 114 utilizing the Hall effect, which occurs when the charge carriers moving through a material experience a deflection because of an applied magnetic field. This deflection results in a measurable potential difference across the side of the material which is transverse to the magnetic field and direction of the current. According to one embodiment, the Hall sensor 116 provides a 50% duty cycle signal (i.e., the ratio of the ON time to the OFF time of the pulses), which in this particular embodiment is two pulses for each revolution/cycle of the fan. Based on the signals provided by the Hall sensor 116, the microcontroller 120 is capable of determining the speed of the cooling fan 100 and making any adjustments necessary to maintain a constant fan speed.

Referring to FIG. 3B, the microcontroller 120 is connected to two metal-oxide semiconductor field effect transistor (MOSFET) drivers 350, 360. Through the MOSFET drivers 350, 360, the microcontroller 120 controls the duty cycle (on time vs. off time) of the voltage provided to the fan motor 114, and more specifically, to the MOSFETs 372, 374, 376, 378 and across the stator 380 (in particular, the coil(s) comprising the stator). According to an embodiment of the present invention, the drains of MOSFETs 372, 376 are coupled to the variable input voltage (from line E1 312). The gate of MOSFET 372 is coupled to the high (H0) line (7) of MOSFET driver 350. The gate of MOSFET 376 is also coupled to the high (H0) line (7) of MOSFET driver 360. The logic on pin 2, input from the microcontroller 120, of each MOSFET driver 350, 360 are controlled by different lines, lines D and E, respectively. The state of pin 2 is the same as the H0 pin of each MOSFET driver 350, 360, and the microcontroller 120 alternates these signals so that MOSFETs 372, 376 are not in the "high" state at the same time.

The sources of MOSFETs 372, 376 are each coupled to a node to which the drains of each of MOSFETs 374, 378 are respectively coupled, and to which the stator 380 is coupled. The gate of MOSFET 374 is coupled to the low output (L0) line (5) of MOSFET driver 350. The gate of MOSFET 378 is also coupled to the low output (L0) line (5) of MOSFET driver 360. The sources of each of MOSFETs 374, 378 are coupled to a reference voltage or ground 338. In the configuration illustrated in FIG. 3B, MOSFETs 372, 378 are "on" at the same time while MOSFETs 374, 376 are "off", and alternatively, when MOSFETs 374, 376 are "on", MOSFETs 372, 378 are "off".

Accordingly, when an increasing speed is detected via the Hall sensor 116, the microcontroller 120 reduces the stator duty cycle to maintain the same energy transfer to the motor windings. The shifts in duty cycle are implemented in program code embedded within the microcontroller 120. Resistor 336 provides a locked rotor detection signal for the microcontroller 120. The microcontroller 120 detects the current flowing through the windings by monitoring the voltage representation of the current that appears on resistor 336. If this voltage exceeds a set threshold set internal to the microcontroller 120, then the output pulses are terminated and a locked rotor condition is perceived. The capacitors C1 and C2 338 provide for voltage ripple filtering and as additional protection to limit high switching currents from causing noise in the user's system.

Figure 4A:
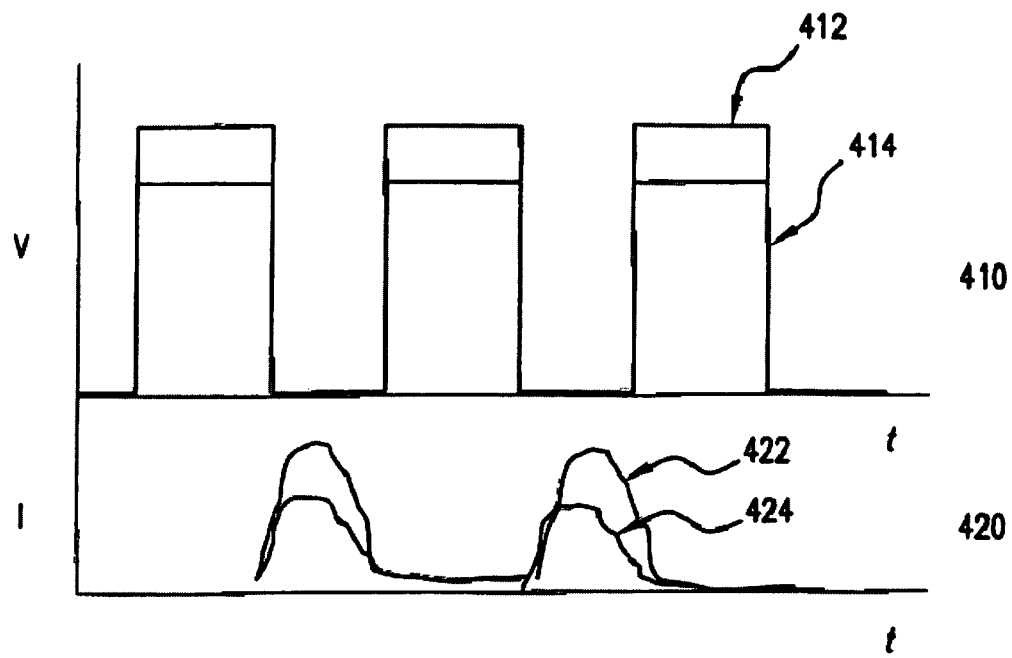
FIG. 4A illustrates voltage and current waveforms according to the prior art.

FIG. 4A illustrates voltage and current waveforms according to the prior art. For example, the nominal voltage for a cooling fan is 48 Vdc. If the voltage is increased to 60 Vdc, for example, the fan has a physical tendency to increase in speed as a reaction to more voltage and energy being switched by the MOSFETs 372, 374, 376, 378 (see FIG. 3B). The top waveform set 410 represents the voltage across a stator 380 with waveform 414 representing 48 volts and waveform 412 representing 60 volts. The bottom waveform set 420 represents the current through the stator 380 with waveform 424 representing a 48 volt input and waveform 422 representing a 60 volt input. Accordingly, without taking any additional measures, the increased voltage and current causes additional energy to be transferred to the coils, which results in a faster spinning fan.

Rather that utilizing a voltage regulating power supply as in the prior art, according to an embodiment of the present invention, the microcontroller 120 of the cooling fan 100 monitors the speed sensor 116, such as a Hall sensor, to detect an increasing speed. Alternatively, the back electromagnetic field (EMF) generated by an increase in speed of the cooling fan 100 may be monitored to detect the increase in speed as well. To compensate for the increasing speed, the microcontroller 120 has program code having instructions to reduce the stator duty cycle (i.e., the on-time vs. the off-time) to maintain the same energy transfer to the motor 114 when an increase in speed is detected. Preferably, the fan speed is controlled utilizing Pulse Width Modulation (PWM), i.e., driving the fan motor 114 using short pulses (the pulses vary in duration to change the speed of the motor—the longer the pulses, the faster the motor turns, and vice versa). The PWM signal is also known by those of ordinary skill in the motor arts as the "commutation signal," the signal that energizes the coils of the motor.

Figure 4B:
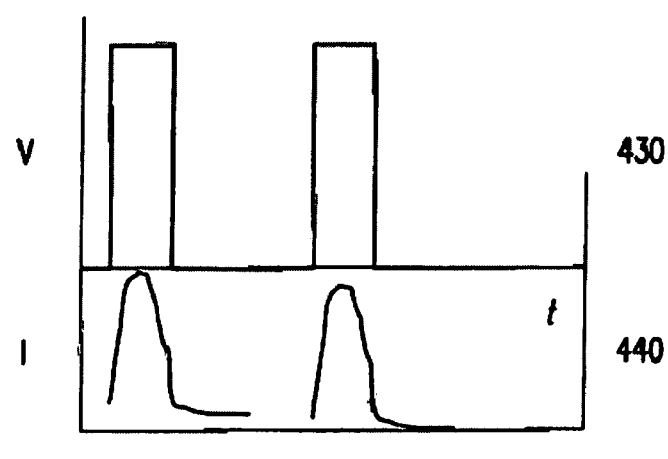
FIG. 4B illustrates a voltage waveform and a current waveform according to an embodiment of the present invention.

FIG. 4B illustrates a voltage waveform and a current waveform according to an embodiment of the present invention. The top waveform 430 represents a reduced stator duty cycle (on-time vs. off-time) of the voltage (e.g., 60 Vdc) as compared to waveform 412 in FIG. 3A. The bottom waveform 440 represents a reduced stator duty cycle of the current as compared to waveform 424 in FIG. 3A. Accordingly, while the voltage and current has increased, the "time-on" of each has been decreased to maintain the same energy transfer to the motor 114, and thereby regulate the fan speed. In one embodiment of the present invention, shifts in the stator duty cycle based on the various voltage levels are preprogrammed in the program code embedded within the microcontroller 120.

Figure 4C:
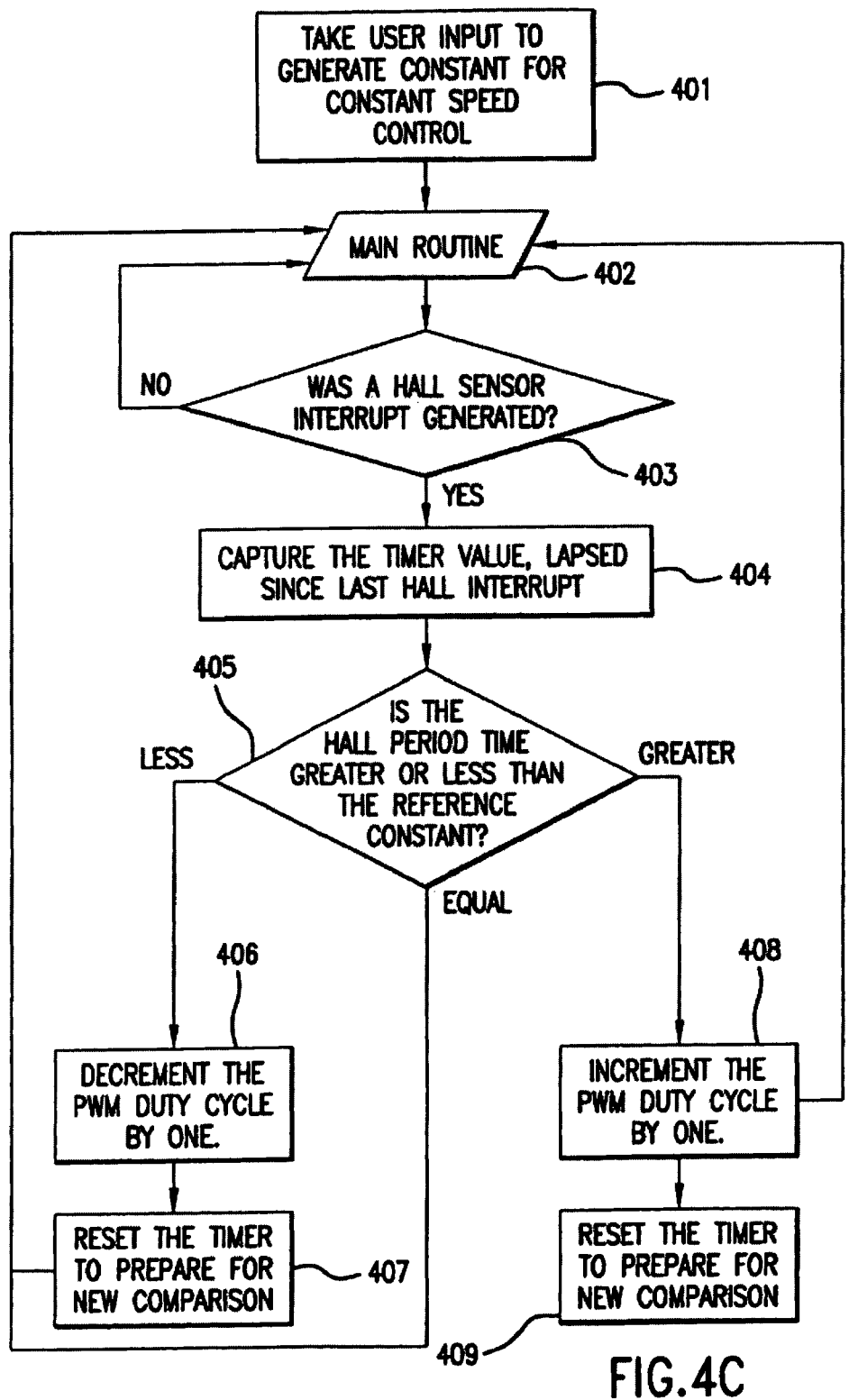
FIG. 4C illustrates a flow chart diagram of a logic path for a microcontroller to maintain a speed of a cooling fan according to an embodiment of the present invention.

FIG. 4C illustrates a flow chart diagram of a logic path for a microcontroller to maintain a speed of a cooling fan according to an embodiment of the present invention. A reference constant is provided 401 (programmed into the microcontroller 120) corresponding to the constant speed at which the cooling fan 100 is to be maintained. The microcontroller 120 enters a main routine 402 for its normal operation. The program code embedded within the microcontroller 120 determines whether a speed sensor interrupt, such as a Hall sensor interrupt signal, was generated 403. If such an interrupt was not generated, then the operation flows back to block 402. If an interrupt was generated, then a timer value lapsed since the occurrence of the last interrupt signal is captured 404. It is determined 405 whether the timer value is greater or less than the reference constant, which represents the desired fan speed. If the timer value is less than the reference constant, then the duty cycle (such as the PWM duty cycle) is decremented 406 by one clock, the timer is reset 407 for a new comparison, and operation flows back to block 402. If the timer value is greater than the reference constant, then the duty cycle (such as the PWM duty cycle) is incremented 408 by one, the timer is reset 409 for a new comparison, and operation flows back to block 402. If the timer value is equal to the reference constant, then the operation flows back to block 402.

By utilizing the cooling fan 100 according to an embodiment of the present invention, the thermal design engineer does not need to design and build a specialized power supply or other additional circuitry in a PCA, controller card, or in the fan tray in order to compensate for the negative effects on cooling due to swings of the system voltage. Moreover, specialized power supplies can easily cost three times that of the fan itself. The cooling fan 100 according to an embodiment of the present invention provides a constant fan speed regardless of the input voltage, and design time and costs are significantly reduced.

Figure 5:
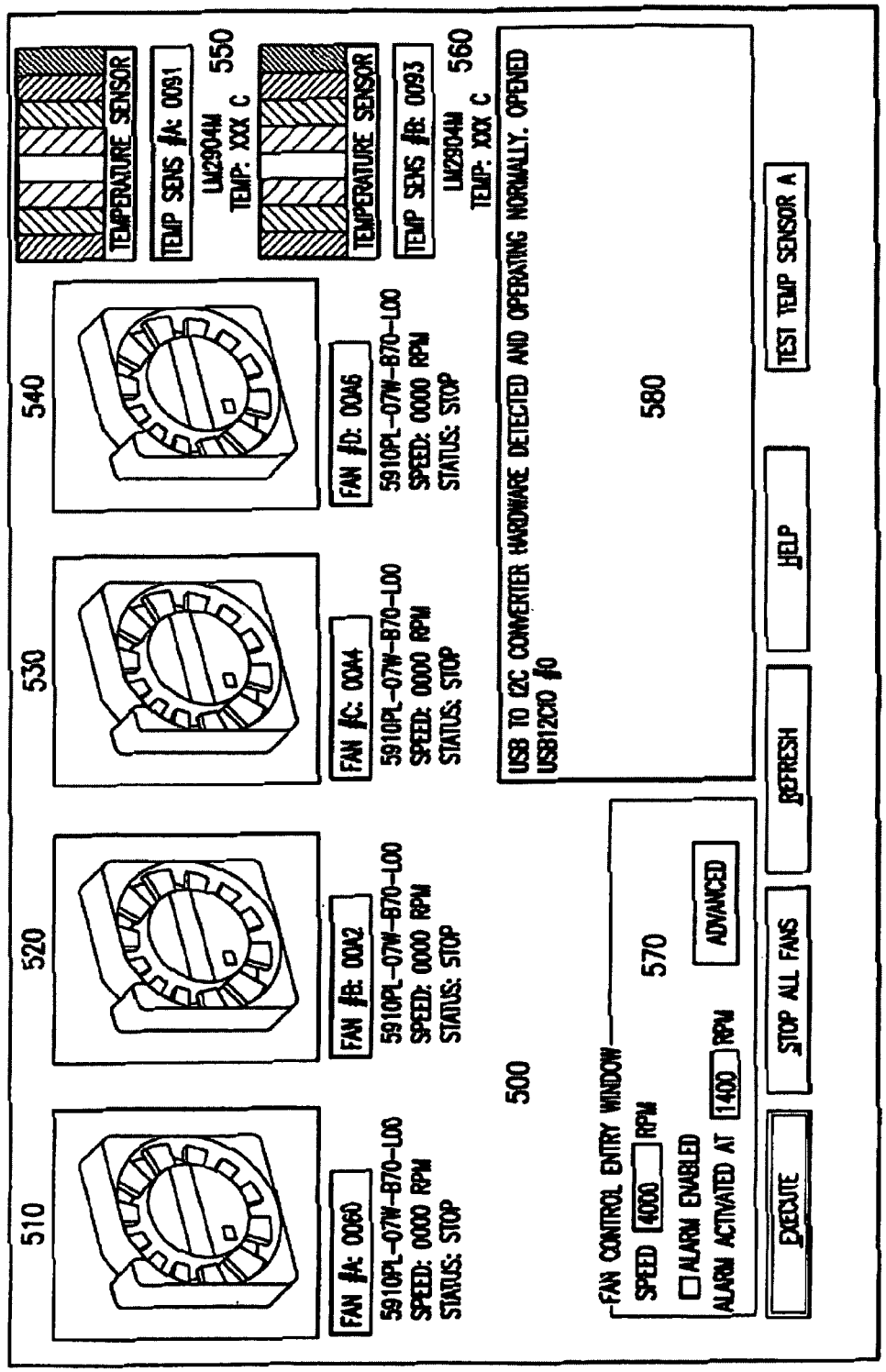
FIG. 5 illustrates a sample screen of a fan controller user interface according to an embodiment of the present invention.

FIG. 5 illustrates a sample screen of a fan controller user interface according to an embodiment of the present invention. The fan controller user interface 500 is preferably a software program executing on a computer system 140 (FIG. 1), such as a desktop personal computer (PC) or a laptop computer. The desktop PC or laptop computer may be connected to a network and accessed remotely via, for example, the Internet using Internet Protocol (IP). The fan controller user interface software 500 enables a thermal design engineer to quickly create a cooling solution for a specific application. A typical application of the fan controller user interface software 500 is for designing a cooling solution for a new cabinet/housing for an electronic system.

When designing a cooling solution for a new cabinet/housing, the design engineer does not know: (1) how much airflow is needed; (2) what types of alarms are required; (3) what functions are necessary on the controller card circuitry; and (4) how the system should behave with increasing system temperature. By utilizing the fan controller user interface software 500 according to an embodiment of the present invention, the design engineer may quickly install cooling fans 100 according to embodiments of the present invention and connect these fans to a computer system (e.g., a desktop PC or a laptop computer) executing the fan controller user interface software 500 to determine the cooling solution specifications for a particular cabinet/housing.

The cooling fan(s) 100 are connected to a power source and then to the computer system executing the fan controller user interface software 500. The cooling fan(s) 100 may be connected to a fan/computer adapter, which converts the communications protocol utilized by the cooling fan(s) 100, such as the I2C protocol, to one recognizable by the computer system, such as the Universal Serial Bus (USB) protocol. The fan/computer adapter then plugs into, for example, the USB port on the computer system so that the computer system is in communication with the cooling fan(s) 100.

After assembling the cooling fan(s) 100 into a system cabinet/housing, the design engineer starts the fan controller user interface software 500. As illustrated in the main screen 500 of FIG. 5, the design engineer may change the speed of any cooling fan 510, 520, 530, 540 connected, set basic alarms, monitor the temperature sensor(s) connected, and constantly refresh the data of all of the cooling fan(s) 510, 520, 530, 540 (part number, speed, alarm status, etc.). In one embodiment, the temperature sensor(s) 122 may be incorporated inside the microcontroller 120. The fan controller user interface software 500 emulates the program code resident in a microcontroller 120 to control the behavior of each cooling fan 510, 520, 530, 540. In other words, the fan controller user interface software 500 is adapted to allow a user to control and operate all of the functions of each cooling fan 510, 520, 530, 540. Therefore, all of the functions of each cooling fan 510, 520, 530, 540 are available to the thermal design engineer for design troubleshooting and prototyping.

The main screen shot 500 of FIG. 5 shows basic information for four cooling fans 510, 520, 530, 540, including their part numbers, fan identifications, fan speed, and status (e.g., active, stop, etc.). Basic information for two temperature sensors is also provided, including their sensor identifications, part numbers, and the temperatures detected. Other information may also be provided to the user on the screen. There is provided a fan control entry window 570 that allows a basic speed of the fans 510, 520, 530, 540 to be set, as well as a basic alarm, for example, to be actuated when the fan speed, revolutions per minute (RPM), drops below a certain level. A message box 580 may also be provided to inform the user of events that occur during the use of the fan controller user interface software 500. The fan speeds of a plurality of cooling fans within a system may be set slightly different from each other so as to test for and eliminate any beat frequencies that may occur, which may cause unwanted noise.

Figure 5A:
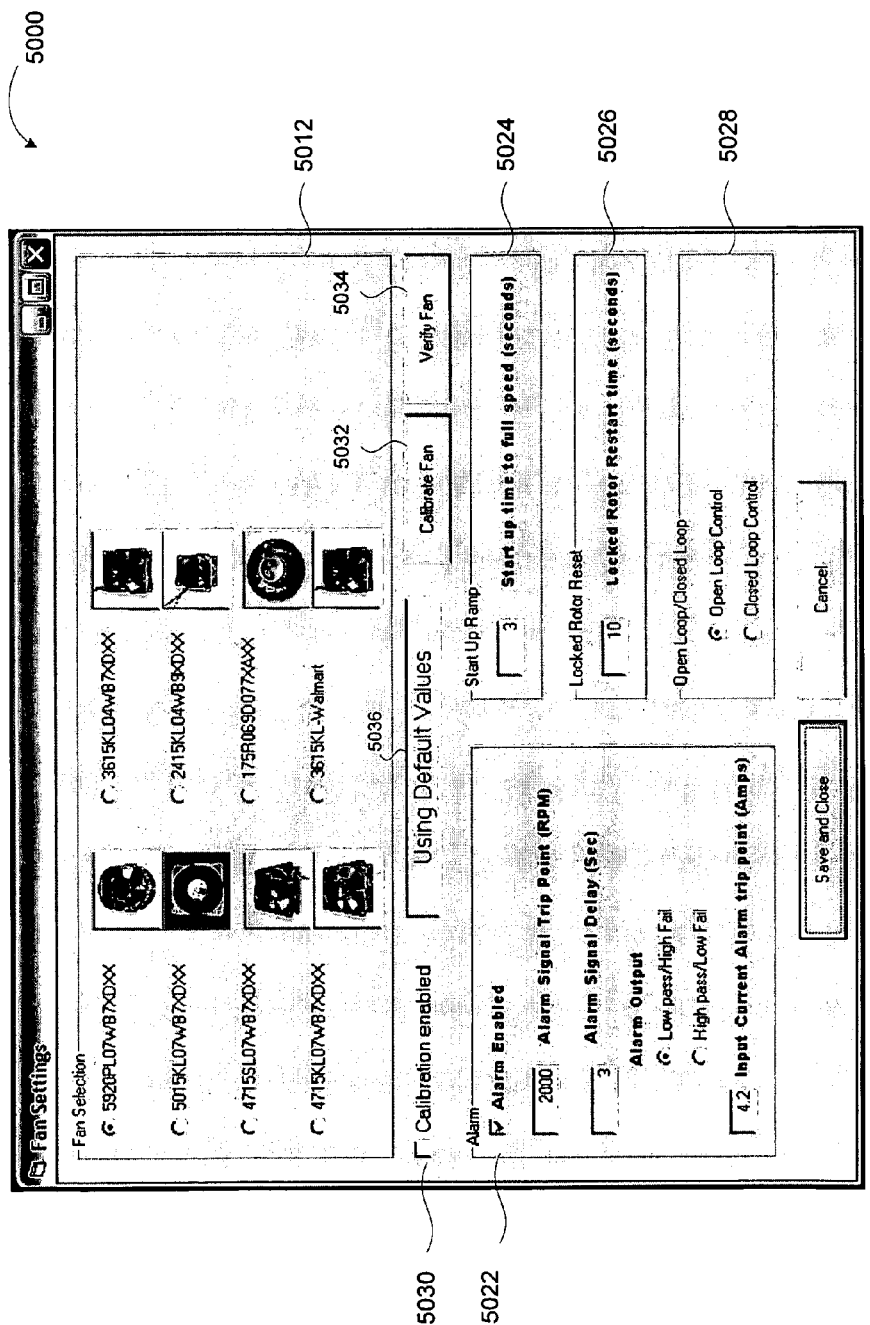
FIG. 5A illustrates a sample screen of a fan controller user interface according to an embodiment of the present invention.

FIG. 5A shows another fan controller user interface 5000 in accordance with another embodiment of the present invention. The controller interface 5000 comprises a fan selection area 5012 within which various types of fans are shown. A fan can be selected by clicking on the radio button of the desired fan. An alarm setup area 5022 allows the user to setup alarm conditions. As in FIG. 5, an alarm signal trip point input area allows the user to specify that the alarm is actuated when the fan speed reaches a trip point, expressed in RPMs. An alarm delay input area allows the user to specify a delay in units of seconds, before the alarm is signaled. This delay allows for situations where the speed of the motor might reach the trip point momentarily; e.g., transient fluctuation in the power, or a brief obstruction in the fan blades.

An alarm output selector allows the user to select the form of the output signal of the alarm. When the fan speed drops below the trip point, say 2000 RPM, the alarm signal is asserted. The "low pass/high fail" radio button, designates that the alarm signal will be LOW when the fan speed is above the trip point value, and will be HI when the fan speed drops below the trip point value. Conversely, the "high pass/low fail" radio button, designates that the alarm signal will be HI when the fan speed is above the trip point value, and will be LOW when the fan speed drops below the trip point value.

As discussed above in connection with FIG. 3B, the microcontroller 120 monitors the current flowing through the windings. The microcontroller 120 operates to maintain a constant fan speed by monitoring the actual speed (via speed sensor 116) and increasing or decreasing the amount of current to the motor. Obstructions can cause the motor speed to decrease. For example, bearing wear will impede rotation of the motor. An obstruction in the fan blades will likewise impede if not stop motor rotation. The microcontroller 120 will sense the reduction in speed and consequently increase the current to the motor coils. Unchecked and uncorrected, this increase in current to the coils will eventually burn out the coils.

In accordance with this embodiment of the invention, the detected current can serve as an alarm trip point. The alarm setup area 5022 includes an input current alarm trip point input area which allows the user to specify a trip point for the input current that drives the fan motor, expressed in units of Amps. When the detected current exceeds trip point current value, the alarm will be triggered. Completing the discussion of the alarm setup area 5022 is a checkbox for enabling the alarm, or disabling the alarm where the alarm will not be triggered despite the trip points being reached.

A start-up setup area 5024 allows the user to specify the a time to reach a given motor speed from a full stop condition, expressed in units of seconds. The start-up time is used by the microcontroller 120 to vary the drive current to the motor coils such that the motor ramps up to the given speed over the specified period of time.

A locked rotor reset setup area 5026 allows the user to define a locked rotor condition. Typically, the fan motor will immediately begin rotating when it is energized. However, under certain conditions the rotor will not rotate; this is referred to as locked rotor. The user can specify in units of seconds, how much time will pass after the fan motor is energized but not rotating before the rotor is deemed to be in a locked condition. After the passage of the specified amount of time, the microcontroller 120 will de-energize the coil, and restart the sequence for starting the motor.

A loop setup area 5028 allows the user to specify whether the fan motor will run in open loop mode or in closed loop mode, by clicking on the respective radio button. The fan motor is said to be driven in open loop mode where there is no feedback to regulate the current or speed. Consequently, these parameters (current and speed) will vary with variations in the input voltage or system impedance. By contrast, in closed loop operation the microcontroller 120 drives the motor in a manner to maintain a target motor speed. The actual speed of the rotor is detected. Based on the detected speed, the microcontroller 120 will either increase the current or decrease the current given to coils in order to maintain the target operating speed of the fan motor.

The user can perform a calibration procedure on the fan motor. This procedure is relevant to the user-defined speed curve discussed below in connection with the embodiment of the invention illustrated in FIG. 9 and related figures. Consequently, a discussion of the related controls such as the calibrate enabled check box 5030, the calibrate fan button 5032, and the verify fan button 5034 will be discussed below in connection with FIG. 9.

Figure 6:
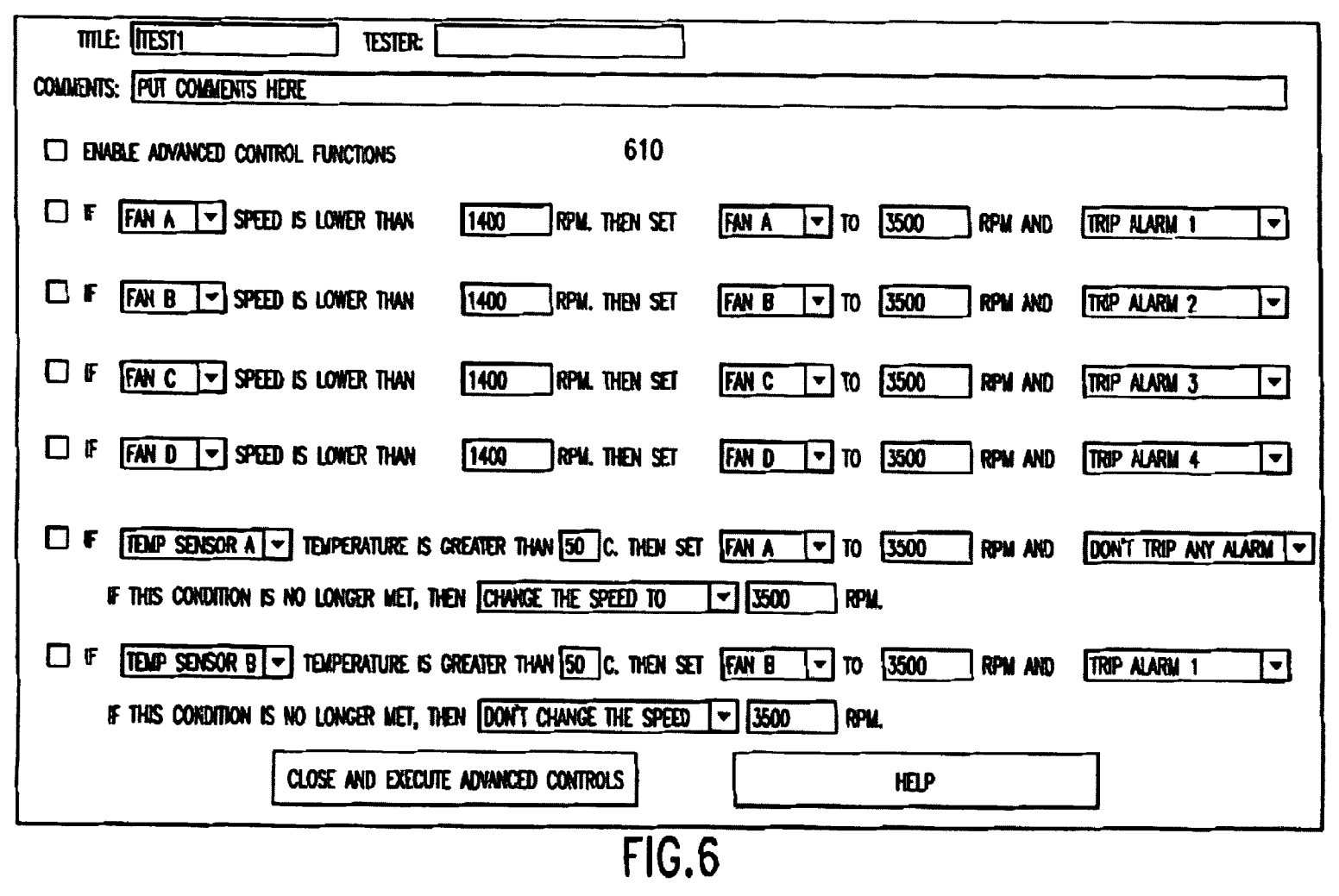

FIG. 6 illustrates a sample screen of advanced functions of a fan controller user interface according to an embodiment of the present invention. In the advanced function screen 610 illustrated in FIG. 6, "what if" conditional scenarios may be set and tested. For example, a scenario may be configured to design an appropriate response to when one of the cooling fans 510, 520, 530, 540 fails. The advanced function screen 610 allows a design engineer to easily conduct such a scenario and program and test for an appropriate response. For example, the following logic condition may be set and tested: If FAN A speed is slower than 1500 RPM then set FAN B to 3500 RPM and TRIP ALARM 1.

The fan controller user interface software 500 may be configured so that the commands are in a straightforward sentence-like structure, allowing the user to manipulate the terms from a menu for the bold-underlined terms above to vary a condition. The above example illustrates a sample condition when one cooling fan (Fan A) that is failing is rotating slower than 1500 RPM, a second cooling fan (Fan B) is adjusted to increase in speed (to 3500 RPM) to provide added cooling to the system, and then alarm 1 is tripped, which may be preconfigured to alert the user that there is a problem in the system (or even more specifically, that Fan A is failing). A number of other conditional scenarios may configured using the fan controller user interface software 500 according to an embodiment of the present invention. Moreover, conditional scenarios involving temperature sensors may also be established using a similar methodology. Therefore, the thermal design engineer is able to set and test a variety of different conditions and program the appropriate behavior for each fan 510, 520, 530, 540 to respond accordingly to each condition.

Figure 7:
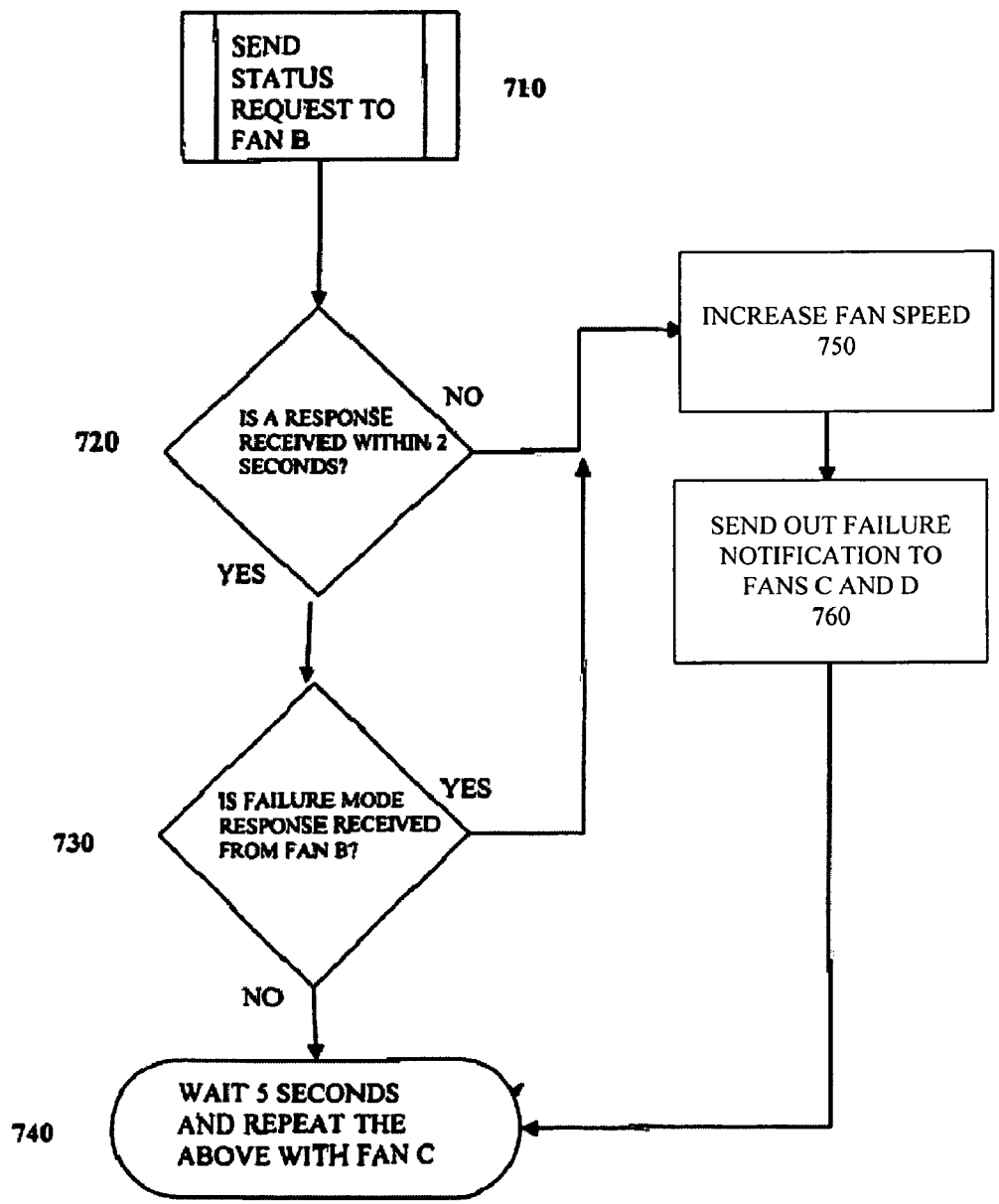
FIG. 7 illustrates a flow chart diagram of a logic path for a cooling fan according to an embodiment of the present invention.

FIG. 7 illustrates a flow chart diagram of a logic path for a cooling fan according to an embodiment of the present invention. FIG. 7 illustrates a failure detect process from the perspective of Fan A in a system having four fans, Fans A-D. According to an embodiment of the present invention, each of the Fans A D have a parallel connection to an Inter-IC (I2C) bus. Initially, Fan A sends 710 a status request to Fan B. It is determined whether a response is received 720 by Fan A from Fan B within a predetermined period of time, e.g., 2 seconds. If a response is received, it is determined whether a failure mode response was received 730. If a failure mode response is not received, Fan A waits for a predetermined period of time, e.g., 5 seconds, then repeats 740 the above iteration with Fan C. If no response is received by Fan A from Fan B within the predetermined period of time (e.g., 2 seconds), or if a failure mode response is received by Fan A from Fan B, then the assumption is that Fan B has failed (or is failing) and Fan A proceeds to increase 750 its fan speed based on the cooling solution specifications/operating parameters and programming determined using the fan controller user interface software 500, a failure notification regarding Fan B's failure is transmitted 760 by Fan A, and Fan A waits for a predetermined period of time, e.g., 5 seconds, then repeats 740 the above iteration with Fan C. Once the iteration with Fan C is completed, the iteration is also performed with respect to Fan D.

Figure 8:
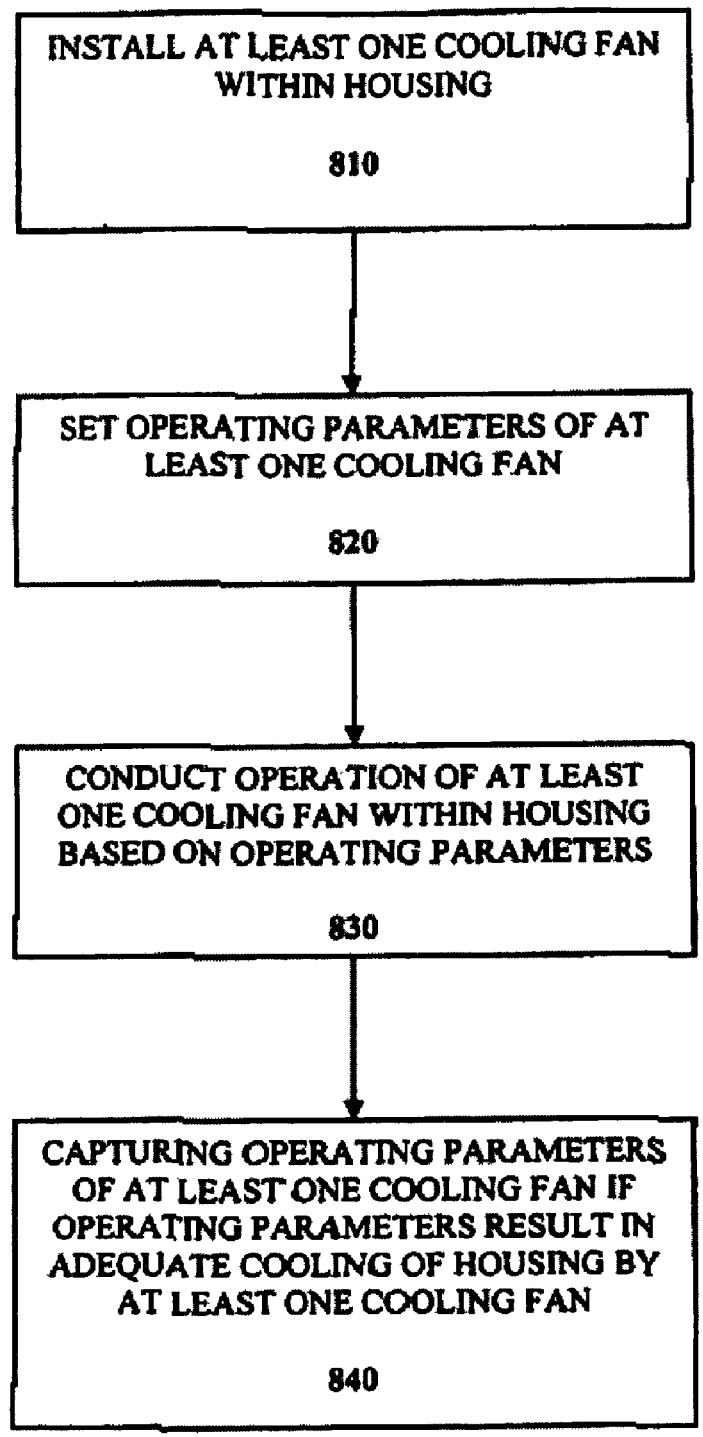
FIG. 8 illustrates a flow chart diagram of determining cooling solution specifications for an electronic system using a cooling fan according to an embodiment of the present invention.

FIG. 8 illustrates a flow chart diagram of determining cooling solution specifications for an electronic system using a cooling fan according to an embodiment of the present invention. At least one cooling fan is installed 810 within a housing. Operating parameters are set 820 for the cooling fan. Operation of the cooling fan within the housing is conducted 830 based on the operating parameters set. The operating parameters of the cooling fan are captured 840 if the operating parameters result in adequate cooling within the housing by the cooling fan.

Once the user has made the appropriate configurations for the behavior for each fan 510, 520, 530, 540 and is satisfied with the functionality of the fans 510, 520, 530, 540 installed in the cabinet/housing, the user may "freeze" the design and store the cooling solution specifications or operating parameters determined (e.g., each fan's RPM settings, alarms, conditions, temperature conditions, conditional behaviors (e.g., to compensate for a fan failure, temperature increase), etc., for that particular cabinet/housing). The cooling solution specifications may be forwarded to a cooling fan manufacturer, and specific cooling fans adhering to the customized cooling solution specifications may be manufactured, including the appropriate programming desired by the engineer set forth during the testing with the fan controller user interface software 500, and provided to the design engineer, knowing already that the cooling solution utilizing cooling fans with these characteristics and programming logic have already been tested and proven.

By utilizing the fan controller user interface software 500 according to an embodiment of the present invention, the thermal design engineer saves a significant amount of time in the design cycle by eliminating the need to design and build a specialized PCA or controller card for controlling the speeds and alarm settings of the cooling fan(s) 510, 520, 530, 540, and eliminating the iteration of asking for a fan sample, trying the fan out in the system, asking for a second higher-powered fan sample, trying the fan out in the system, etc., to determine a suitable cooling solution for a cabinet/housing. The thermal design engineer is able to balance airflow, noise, redundancy, and temperature response utilizing the fan controller user interface software 500 without having to go through an iterative process.

Referring back to the embodiment illustrated in FIG. 1A, operation of the motor of a fan involves driving the cooling fan unit 100 with an externally provided user-provided pulse-width-modulated (PWM) commutation signal. The user typically specifies how he wants his fan(s) to be operated. A typical criterion is that different duty cycles of the PWM signal that he provides to the fan unit 100 should operate fan at different speeds. For example, for duty cycles between 1% and 50%, the user might want to fan speed to vary linearly from 100 RPM to 2000 RPM, and between 51%-100%, the user might want to fan speed to vary linearly from 2500 RPM to 4000 RPM. The user can specify this aspect of fan operation by way of a "speed curve." The discussion will now turn to FIG. 9 to discuss an embodiment of another aspect of the present invention, namely customization of the speed curve of a fan's motor.

Figure 9:
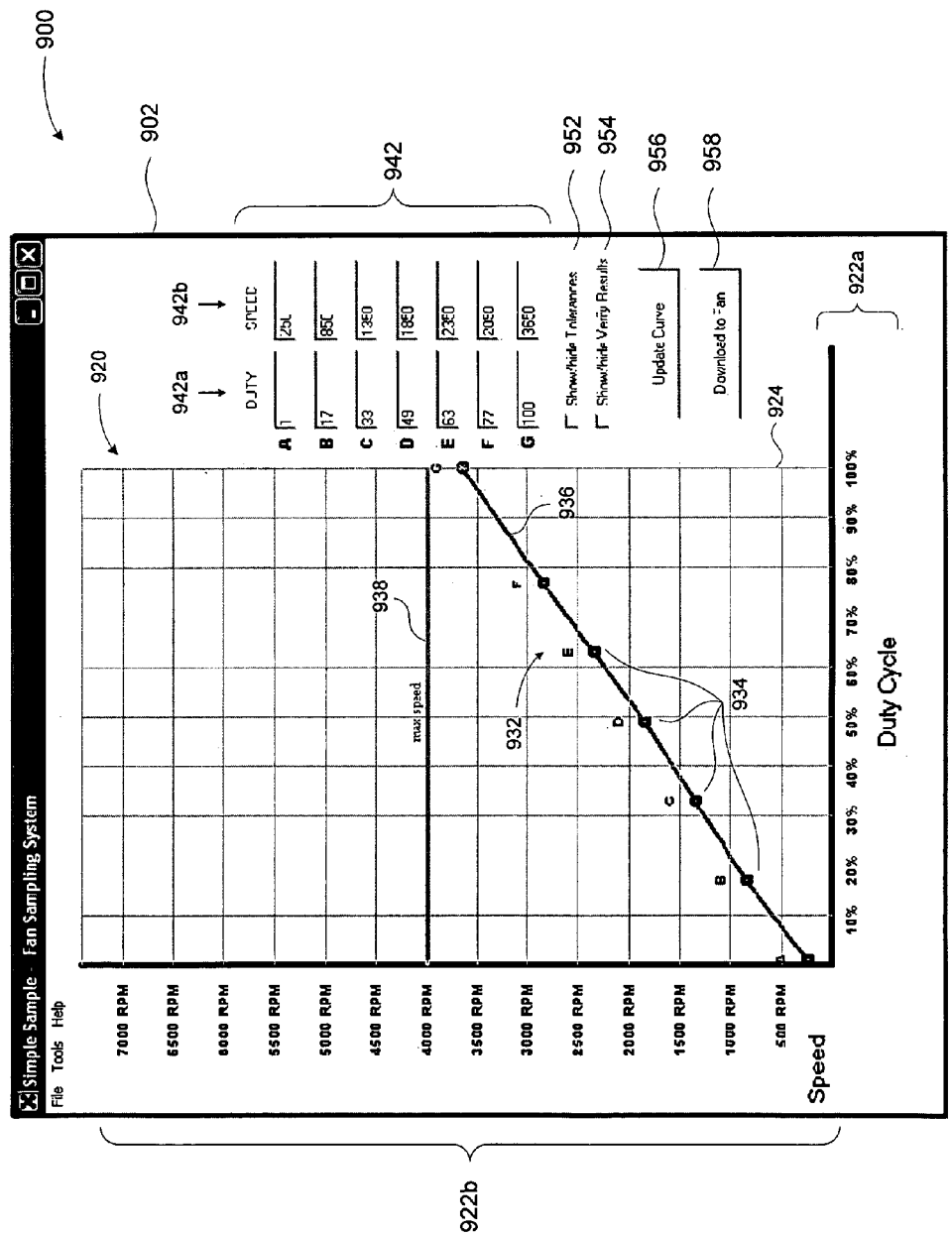

FIG. 9 is a screenshot of an illustrative speed curve configuration user interface 900 according to an embodiment of this aspect of the present invention. The speed curve configuration user interface 900 can be provided by executing suitable software on the computer system as described above for the fan controller user interface 500 of FIG. 5.

For illustrative purposes, the instantiation of the user interface 900 shown in FIG. 9 allows the user to specify the speed curve for a single fan (more specifically, the motor of the fan). However, it will be readily apparent to one of ordinary skill that an alternative embodiment of the speed curve definition user interface 900 can be provided which allows customization of a group of fans (i.e., to customize the motors in a group of fans with the same speed curve), in addition to customizing individual motors.

The speed curve definition user interface 900 can be accessed from the fan controller user interface 500. For example, the fan controller user interface 500 displays iconic representations of fans 510, 520, 530, 540. A convention can be adopted in the fan controller user interface 500 whereby double-clicking on the iconic representation of a fan will cause the speed curve definition user interface 900 for the selected fan to be presented to the user. In another embodiment, the speed curve definition user interface 900 can be provided with suitable input graphics that allow the user specify a fan or fans to which the speed curve would be applied.

Referring to FIG. 9, the speed curve definition user interface 900 is presented in a window 902. The interface 900 includes a graphical representation of the speed curve 932 displayed on a suitable graph 920. The graph 920 includes axes 922a, 922b. The first axis 922a represents the duty cycle of each of the pulses comprising a PWM (pulse width modulated) signal that energizes the coils of the fan motor. In the instantiation of the interface 900 shown in the figure, the duty cycle axis 922a is divided into intervals, ranging from 0% duty cycle to 100% duty cycle in 10% increments. Of course, greater or lesser increments (e.g., 5% increments) can be provided. The vertical axis, referred to as the speed axis 922b, represents fan speed in terms of RPM (rotations per minute). FIG. 9 shows the speed axis 922b having a range from 0-7000 RPM and is divided into 500 RPM intervals. The graph 920 includes a grid 924 to facilitate manipulating the points of the speed curve 932.

In another embodiment of the present invention, the speed curve 932 can be based on temperature as the controlling criterion, where the fan is operated at a given speed for a given temperature based on the curve. FIG. 9A shows an example screenshot 900' of a speed curve 932', where the first axis 922a represents temperature, allowing a user to set fan speeds based on temperature points instead of duty cycle values. A temperature sensor (typically a thermistor 116 such as illustrated in FIG. 1) can be attached to the fan or in the vicinity of the fan. Temperature readings can be fed to the microcontroller 120, which would then adjust the fan speed based on the temperature-based speed curve 932'.

Returning to FIG. 9, the speed curve 932 is displayed on the grid 924 as a set of setpoints 934. Each setpoint 934 specifies a correspondence between a speed of the motor (e.g., y RPMs) with a given duty cycle (e.g., x % duty cycle). Although FIG. 9 shows only seven such setpoints A-G, one of ordinary skill will readily appreciate that more (or fewer) setpoints can be provided on the speed curve 932. The speed curve 932 is completed by a line 936 that connects the setpoints 934.

A limit indicator 938 can also be provided to inform the user of a given motor's maximum speed limit. The location of the limit indicator 938 will vary from one motor to the next. The limit indicator 938 prevents a user from attempting to set the motor speed above its maximum speed to avoid damaging the motor.

Figure 9B:
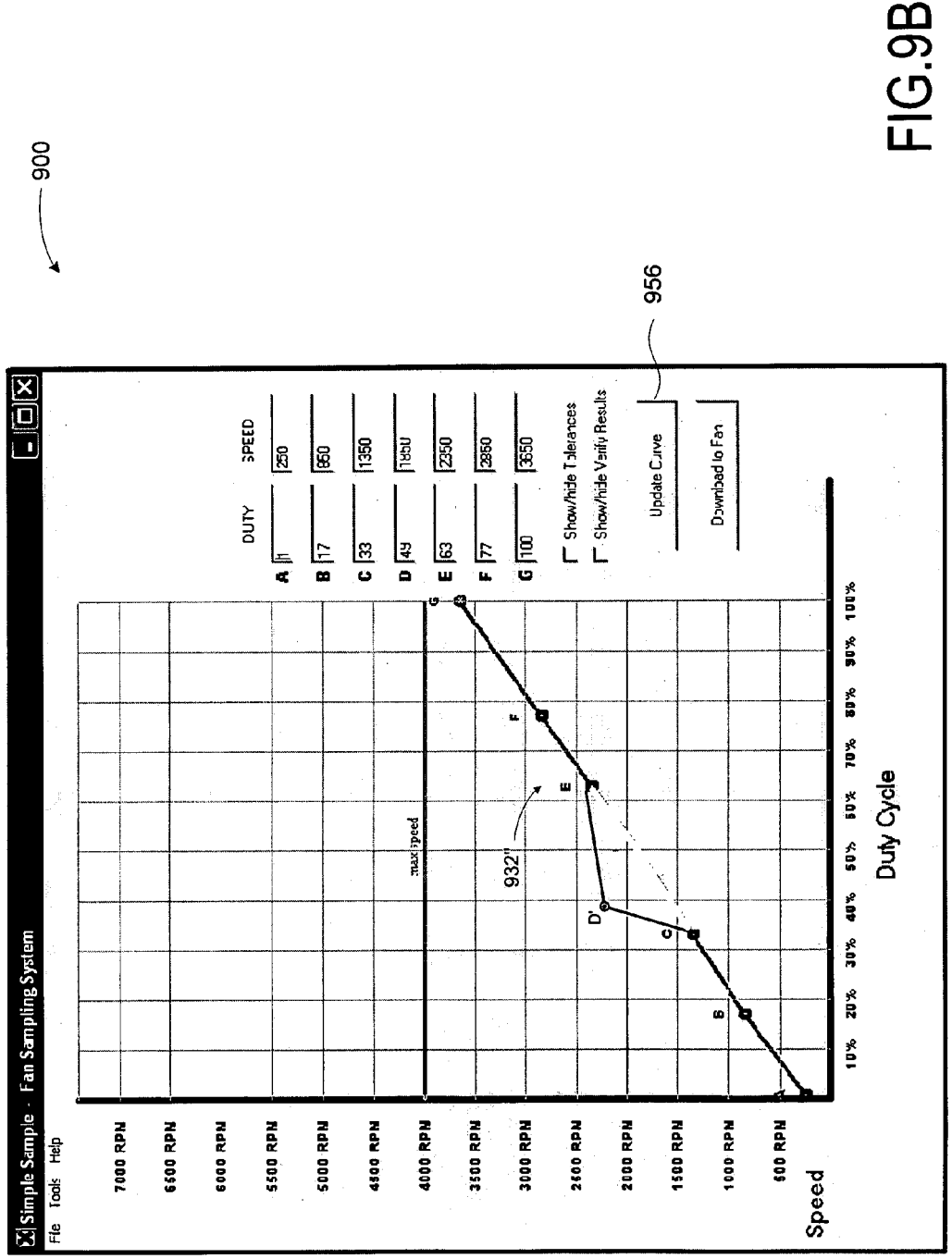

Refer now to FIG. 9B for a moment. Another aspect of the present invention is that the user can manipulate the setpoints 934 that comprise the speed curve. For example, the user can move a setpoint (e.g., D) to a new location (e.g., D') on the grid 924. The speed curve is redrawn as the user manipulate the setpoints 934. FIG. 9B shows the revised curve 932". The speed curve 932" is fully customizable because the user can adjust any number of the setpoints 934 to produce any desired speed curve. Setpoints 934 can be deleted. Conversely, setpoints can be added to the speed curve 932", for example, by double-clicking at a location on the speed curve.

Returning to FIG. 9, a speed curve data form 942 can be presented to the user and serve as an alternative to manipulating the setpoints 934. In the particular embodiment shown, the data form 942 is organized into a column of data input fields for duty cycle (the duty cycle column 942a) and a column of data input fields for the speed (the speed column 942b). The user can manually enter duty cycle and speed values into the respective data input fields for each setpoint 934. The user can then cause the speed curve 932 to be redrawn by clicking an update button 956, discussed in more detail below.

The speed curve 932 and the speed curve data form 942 can be dynamically linked. Thus, changes via one input format (speed curve 932 or speed curve data form 942) can be reflected (updated) in the other input format (speed curve data form 942 or speed curve 932). The update can occur concurrently as the user adjusts a setpoint 932, or if the user clicks on the update button 956.

Additional function-activating buttons can be provided to facilitate the user's interaction in the speed curve definition interface 900. For example, a tolerance display checkbox 952 can be provided to alternate between displaying and hiding tolerances in the speed value. The tolerance is a result of the overall fan design and is about +/−200 RPM regardless of fan size. When the tolerance display checkbox 952 is "checked" the tolerance can be displayed as a graphic element that overlaps the speed curve 932. Thus, for a tolerance of +/−200 RPM, the graphic element can be an upper limit curve that follows the speed curve 932 but displaced vertically in the positive direction by 200 RPM and a lower limit curve that follows the speed curve 932 but displaced vertically in the negative direction by 200 RPM. This gives the user a readily perceived visual representation of the variations in actual fan speed that the user can expect.

Figure 9C:
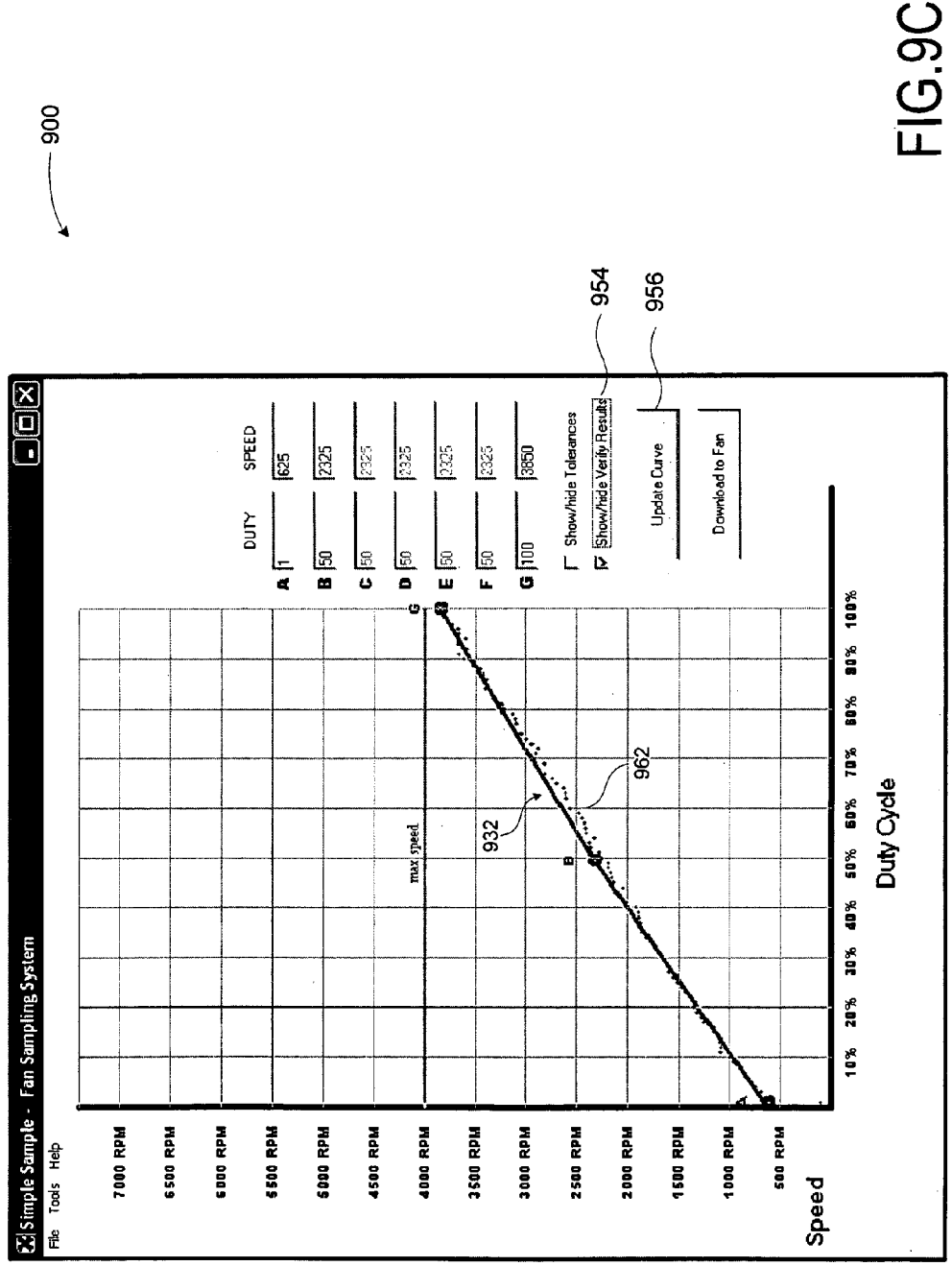

A verify checkbox 954 can be provided to display a verification operation previously performed on the speed curve 932. Verification of a speed curve serves to provide an indication of how accurately the fan motor (or motors) operates accordance with a speed curve 932 that the user specified. The verification procedure is explained in more detail below in connection with a further discussion of FIG. 5A and in particular with respect to the verify fan button 5034. The user can activate the verify checkbox 954, for example by clicking on the checkbox graphic. Referring to FIG. 9C, the data that is collected during a verification operation is plotted as a verification plot 962. The results can be examined by an engineer or technician to assess motor operation. Unchecking the verify checkbox 954 will remove (hide) the verification plot 962 from the display.

Figures 10, 10A, 11:
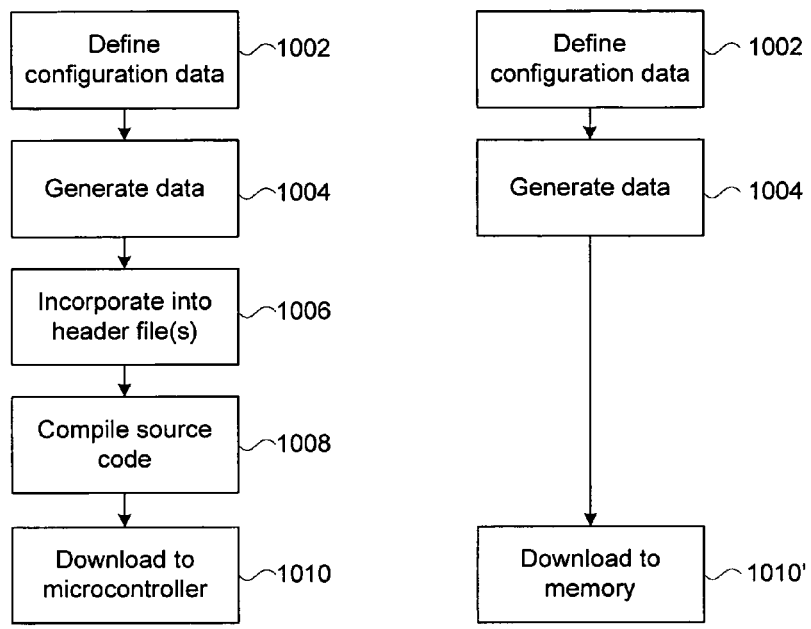
FIGS. 10 and 10A highlight the steps of a design cycle according to an embodiment of the present invention.
FIG. 11 shows an example of a header file containing operating parameters for the fan motor generated in accordance with an embodiment of the present invention.

Referring now to FIG. 9 and to FIG. 10, a typical design cycle according to this embodiment of the present invention includes the user defining the configuration data (more specifically the speed curve) step 1002, for example via the user interface of FIG. 9. Recall that the update button 956 allows the user to redraw (update) the speed curve 932 after he has adjusted the setpoints 934, either by interacting with the graph 920 or via the speed curve data form 942. In a particular instantiation of the invention, a straight line segment is computed between pairs of setpoints 934. For example, using the line equation y=mx+b, it is a matter of basic algebra to compute slope 'm' and y-intercept 'b' using coordinate pairs (x1, y1) and (x2,y2), where the x- and y-coordinates are duty cycle and speed, respectively.

However, it will be apparent to one of ordinary skill that any of a number of well known curve fitting techniques can be used to draw the speed curve, including various interpolation methods, regression analysis techniques, and so on. The particular method of generating the curve is not important. Typically a rough approximation is all that is needed, and the specific method is largely decided based on computation burden and memory storage. In one embodiment, the user can be presented with a selection of a variety of curve-fitting techniques.

As shown in FIG. 10, activating the update button 956 also generates the data (step 1004) that will used to control the microcontroller 120. The nature of this data in accordance with a particular instantiation of this embodiment of the present invention will be explained in further detail below. A download button 958 is provided to allow the user to download the data derived from the user-defined speed curve 932 to the fan motor (or motors). In this embodiment of the invention disclosed, a compiled binary object is downloaded into the microcontroller 120 (FIG. 1). The microcontroller 120, operating in accordance with the binary object generates a commutation signal for driving the coils of the motor according to the data contained in the binary object.

In a particular instantiation, the binary object is obtained by compiling source code written in the C programming language. The source code constitutes the source program that the microcontroller 120 executes. The data that are derived from the speed curve 932 is stored in one or more source code header files (step 1006). An example of a fragment of a header file containing such data is shown in FIG. 11. For example, the PWM_array is used by the microcontroller 120 to energize the motor 114. Other parameters are included that correspond to the settings made by the user via the controller interface of FIG. 5A, including for example alarm enables, alarm trip points, and so on.

The 'PWM_array' is an array of 100 entries, each corresponding to an increment of 1% duty cycle of a user-provided commutation signal. Each entry contains a value which corresponds to the user's specified fan speed for that duty cycle. Thus, for example, the user-defined speed at 1% duty cycle (i.e., first entry in the array) is represented by a number "79", the user-defined speed at 41% duty cycle is represented by a number "109", and the user-defined speed at 100% duty cycle is represented by a number "756". These numbers in turn represent timer values corresponding to the user-defined fan speeds that that the microcontroller 120 software can understand. As will be explained in more detail below, the data is used by the microcontroller 120 to generate an internal commutation signal to generate the electric current used to energize the rotor coils of the motor 114.

Continuing with FIG. 10, in a step 1008 the header file is compiled along with the microcontroller source code to produce the binary object. The resulting binary code is then downloaded into and stored in the microcontroller 120 (step 1010) for subsequent execution.

FIG. 10A illustrates an alternative embodiment wherein the data is directly downloaded into a non-volatile memory 124 (FIG. 1) provided with the microcontroller 120. In this embodiment, the data generated in step 1004 does not need to be compiled. Consequently, the header insertion step 1006 and the compile step 1008 are note needed. The data simply downloaded to the memory device (e.g., 124) provided with the microcontroller 120 (step 1010'). In this embodiment, the microcontroller 120 is programmed to access the address space assigned to the memory device 124 to read out the data used to generate the commutation signal for generating the current to energize the motor coils.

A brief discussion will now be made concerning the data shown in FIG. 11. Referring to FIG. 1A, the PWM signal shown in the figures represents a commutation signal that a user provides to operate the cooling fan motor 114. The input curve 932 is defined by the user with respect to the PWM signal that will be produced by his equipment to operate the fan(s). In a particular instantiation of this embodiment of the present invention, the motor 114 in turn includes circuitry (as exemplified in FIGS. 3A and 3B) that produces an internal commutation signal appearing on lines D and E (FIG. 3A) that is used to drive the motor (via the MOSFET drivers 350, 360). This internal commutation signal is generated based on the user-provided commutation signal, namely the PWM shown in FIG. 1A. The timer values in the "PWM_array" shown in FIG. 11 are used by the microcontroller 120 to generate these internal commutation signal having duty cycles sufficient to operate the motor 114 at the desired user-defined speeds.

It was discovered that there is some tolerance involved with how accurate the motor speed is when compared to the desired speed target. Due to variations in mechanical and electrical tolerance, the fan speed will vary to some degree. A calibration procedure can be performed with the motor 114 (FIGS. 1 and 1A) to produce calibration data that can be used to improve accuracy of operation when the motor is operated in accordance with the user-defined speed curve 932. The calibration procedure includes generating a series of internal commutation signals on lines D and E (FIGS. 3A and 3B) of varying duty cycles (e.g., from 1% to 100% in 1% increments), and for each duty cycle measuring the speed (RPM) that the fan reaches for a commutation signal having a given duty cycle.

Referring back to FIG. 5A for a moment, the screenshot shows a calibrate fan button 5032. The calibrate fan button 5032 allows the user to calibrate the fan motor 114. By clicking on the calibrate fan button 5032, the fan will be controlled to incrementally step through the operating duty cycles, starting at 1% duty cycle and going to 100% duty cycle. The microcontroller 120 generates a series of internal commutation signals on lines D, E of different duty cycles. For each duty cycle point, the motor 114 is allowed to run for a period of time (e.g., about 1 second) long enough to allow the motor to reach its maximum speed. This speed represents the actual fan speed at that duty cycle point. This speed measurement and the corresponding duty cycle value (expressed as a timer value) of the internal commutation signal is recorded in microcontroller memory 124. The resulting set of data represents what will be called a "natural speed curve."

When the calibration cycle is completed, the collected information (i.e., the natural speed curve data) is downloaded to the computer system 140. The computer system 140 will then take this information and adjust its output accordingly, now that it "knows" the actual performance of the fan. The net result is that the next time the fan is programmed with a custom speed curve 932, the values (e.g., PWM_array[ ]) provided to the microcontroller by the computer program will be more accurate and the resulting speed performance has a small tolerance when compared to what is desired.

The computer system 140 "adjusts" the user-defined speed curve 932 by mapping the user's desired speed to the duty cycle (expressed as a timing value) on the "natural speed curve" corresponding to the desired speed. For example, suppose the user desires to run the fan at 500 RPM when his equipment supplies a 30% duty cycle PWM signal (FIG. 1A); the setpoint 934 on the speed curve 932 for 30% would be set at 500 RPM. Suppose further that the "natural speed curve" obtained during the foregoing calibration procedure indicates that a 20% duty cycle internal commutation signal produces a fan speed of 500 RPM. The computer 140 will generate a PWM_array[ ] in which entry 30 (corresponding to the user's 30% duty cycle) contains a timer value (obtained from the natural speed curve) that will cause the microcontroller 120 to produce an internal commutation signal having a 20% duty cycle.

FIG. 5A shows a verify fan button 5034 which allows the user check speed curve 932 against the results of the foregoing calibration step. This action collects the data that can then be viewed via user interface 900 by activating the verify checkbox 954. When the verify fan button 5034 is pressed, the fan will step through the user programmed speed curve 932 from a duty cycle of 1% to 100%. At each increment of 1% duty cycle, the actual speed is recorded in the microcontroller memory 123. At the end of this process, the results are transferred to the computer 140. The user may now display the actual fan performance on the same graph as the desired performance to prove that the fan is indeed behaving as requested.

The display area 5036 indicates whether or not the computer system 140 has adjusted the user-defined speed curve 932 with the "natural speed curve." If the user-defined speed curve 932 has not been adjusted in accordance with the "natural speed curve," the display area 5036 displays "using default values."

Figure 12:
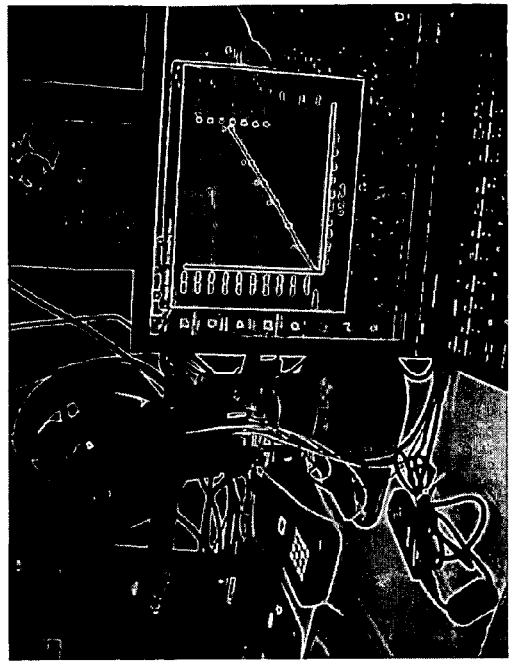
FIG. 12 are images of an actual system configuration instantiated in accordance with an embodiment of the present invention.
Figure 12:
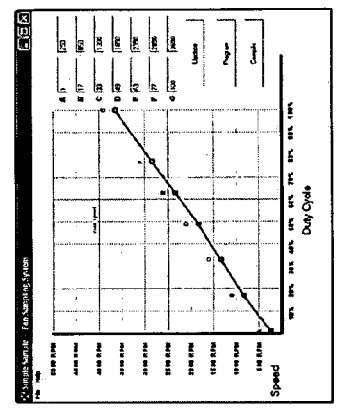
Figure 12:
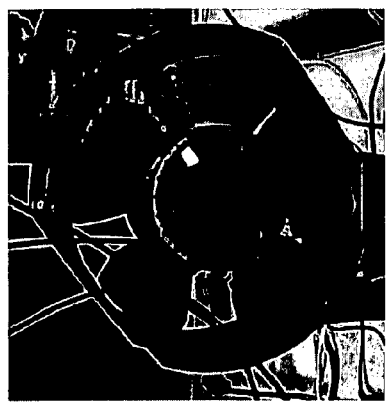
Figure 12:
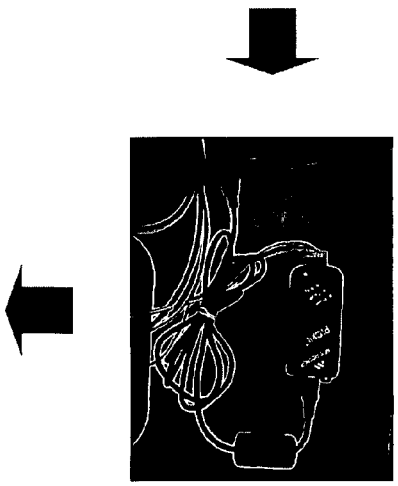

FIG. 12 shows images of a system configuration according to an embodiment of the present invention, as illustrated for example in FIG. 1. The system configuration includes a suitable computing device 140 such as a laptop computer running software to provide the fan controller user interfaces shown in FIGS. 5 and 9, for example. Data generated by the software is downloaded to the microcontroller 120 of a microcontroller fan via a programming interface device. The figure shows an example of such a programming device known as the PICkit II Programmer sold by Microchip Technology, Inc. Examples of microcontroller fans include a line of products manufactured and sold by the assignee of the present invention, and are illustrated in FIGS. 5 and 5A.

Figure 13:
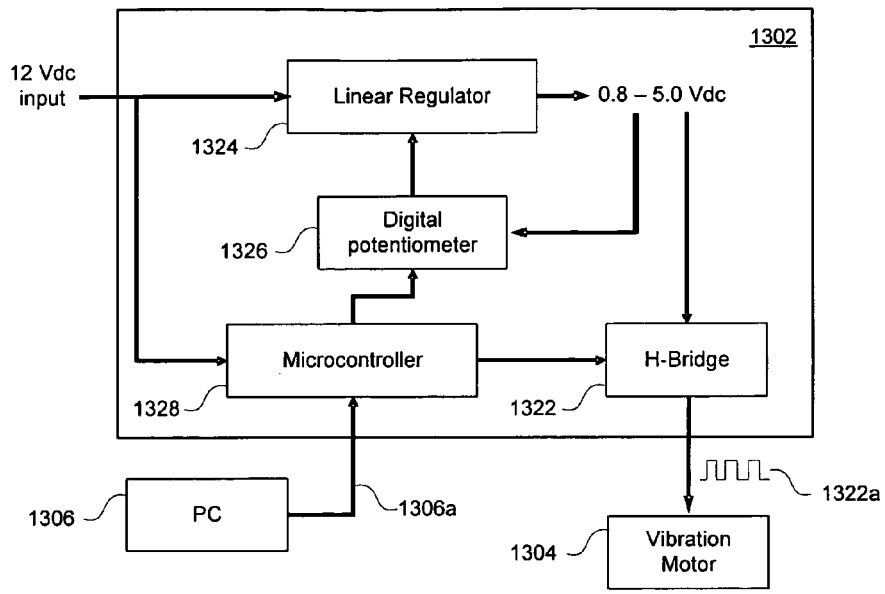
FIG. 13 illustrates a system configuration in accordance with an embodiment of the present invention.

The discussion will now turn to another embodiment of the present invention directed to the programming electrical drive circuitry for a class of motors known as vibration motors. Vibration motors are used in cellular telephones to provide the familiar vibration effect when the phone is placed in a silent mode of operation. FIG. 13 is a schematic illustration of an embodiment of the present invention directed to vibration motors. A vibration motor 1304 is connected to drive system 1302. The drive system 1302 comprises a circuit 1322 configured in an H-bridged configuration such as the circuit illustrated in FIG. 3B, for example. The H-bridge circuit 1322 (a bipolar drive) is an electrical drive circuit that is controlled to produce the drive signals for operating the vibration motor 1304. One of ordinary skill will realize that a unipolar drive can be used as well.

The H-bridge 1322 is powered by a voltage regulator 1324. In the example shown in the figure, the voltage regulator 1324 is supplied with a 12 Vdc source (e.g., a battery) and provides an output voltage that varies from 0.8-5.0 Vdc. The output of the voltage regulator 1324 is controlled by a microcontroller 1328 via a digital potentiometer 1326. In accordance with this aspect of the present invention, the microcontroller 1328 controls the voltage regulator 1324 and the H-bridge 1322 to a suitable pulse-width modulated (PWM) signal, also referred to as a commutation signal and referred to herein as a pulse train 1322a, to drive the vibration motor 1304. A suitable computer 1306 (e.g., a PC system) is provided to program the microcontroller 1328 over a suitable communication interface 1306a such as an I2C interface.

The microcontroller 1328 can be configured to operate the vibration motor 1304 in a variety of ways to optimize performance of the motor for a given use. This can greatly facilitate the development effort for cell phone manufacturers, for example. It will be understood from the descriptions below that this embodiment of the present invention can be readily adapted for use in a user environment to allow cell phone users to create custom "vibrations" (not unlike custom ringtones) for their cell phones.

Vibration motors are typically driven by a variety of pulses, referred to as the pulse train. Typical types of pulse trains include:
    fixed frequency—fixed duty cycle operation (FIG. 14A)
    fixed frequency—variable duty cycle operation (FIG. 14B)
    variable frequency—fixed duty cycle operation (FIG. 14C)

Figure 14A:
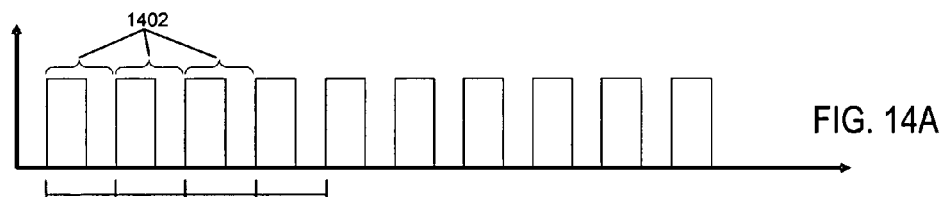
FIG. 14 shows different types of pulse train configurations.
Figure 14B:
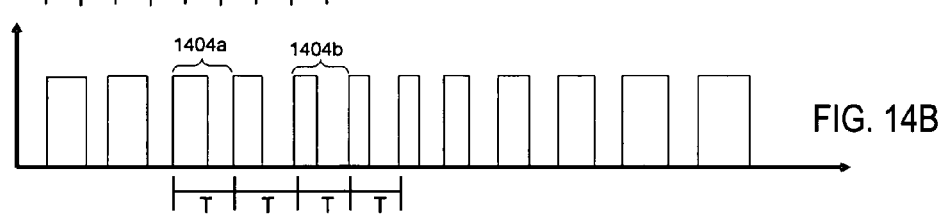
Figure 14C:
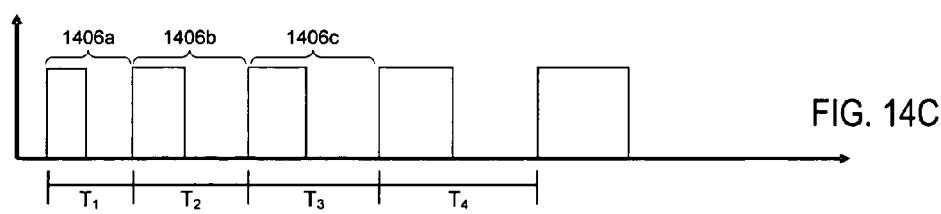

For example the pulse train schematically represented in FIG. 14A comprises pulses 1402, each having the same frequency (i.e., period T) and each having the same duty cycle (i.e., the on/off ratio of each pulse is the same. The pulse train schematically represented in FIG. 14B comprises pulses, each having the same frequency (represented by period T), but having duty cycles which differ among at least some of the constituent pulses. For example, pulse 1404a has a duty cycle (on/off ratio) that is different from the duty cycle of pulse 1404b; however, their periods are the same. The pulse train schematically represented in FIG. 14C comprises pulse having frequencies that differ among at least some of the pulses, but having the same duty cycle. For example, pulses 1406a-c have different frequencies as indicated by periods $T_1$, $T_2$, and $T_3$ which are different. However, each pulse 1406a-c has the same duty cycle.

Figure 14D:
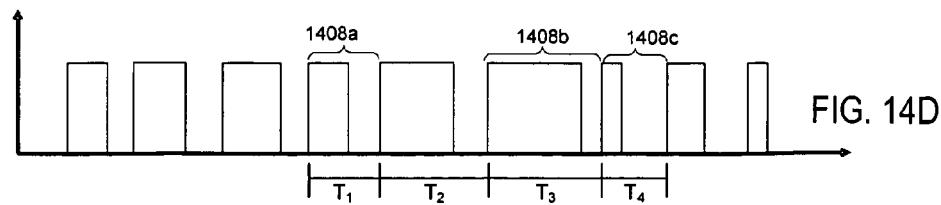

In addition, it was recognized by the inventors that there are some advantages to being able to provide variable frequency—variable duty cycle pulse trains as well, such as the schematic example shown in FIG. 14D. In general, the pulses to drive a vibration motor need to be optimized for smooth operation and fast start time. It was discovered that the best performance is obtained from the variable frequency—variable duty cycle type of pulse train. For example, FIG. 14D shows a pulse train comprising pulse, at least some of which have different frequencies (indicated by different periods $T_1$, $T_2$, and $T_3$) and at least some of which have different duty cycles. The duty cycle of pulse 1408a differs from the duty cycle of pulse 1408b. Likewise, the duty cycle of pulse 1408c differs from the duty cycles of pulses 1408a and 1408b.

In accordance with this embodiment of the present invention, four variables can be adjusted in order to obtain a suitable commutation signal for driving vibration motor 1304:
    frequency
    duty cycle
    voltage
    number of pulses In accordance with this embodiment of the present invention, the PC system 1306 is configured with a user interface that allows a user to specify frequency, duty cycle, and pulse voltage is for each pulse, as will be discussed in more detail below. The user interface also allows the user to set the number of pulses that will be supplied with those conditions. In a particular instantiation of the this embodiment of the present invention, the user interface can accept a 100 different pulse configurations. As will be explained in more detail below, each pulse configuration defines the properties of one or more pulses. The user interface is further configured with management utilities including saving the data (referred to as a profile), recall a previously saved profile, import and export data for a profile respectively to and from other data formats (e.g., data can be exchanged with a spreadsheet program such as Microsoft's Excel spreadsheet program and stored in an Excel spreadsheet data file).

The user interface is still further configured with utilities to interact with the motor 1304, including downloading data to (or otherwise programming) the drive system 1302 (in particular to the microcontroller 1328) and controlling operation of the motor via suitable commands from the user interface to the microcontroller.

Figure 15:
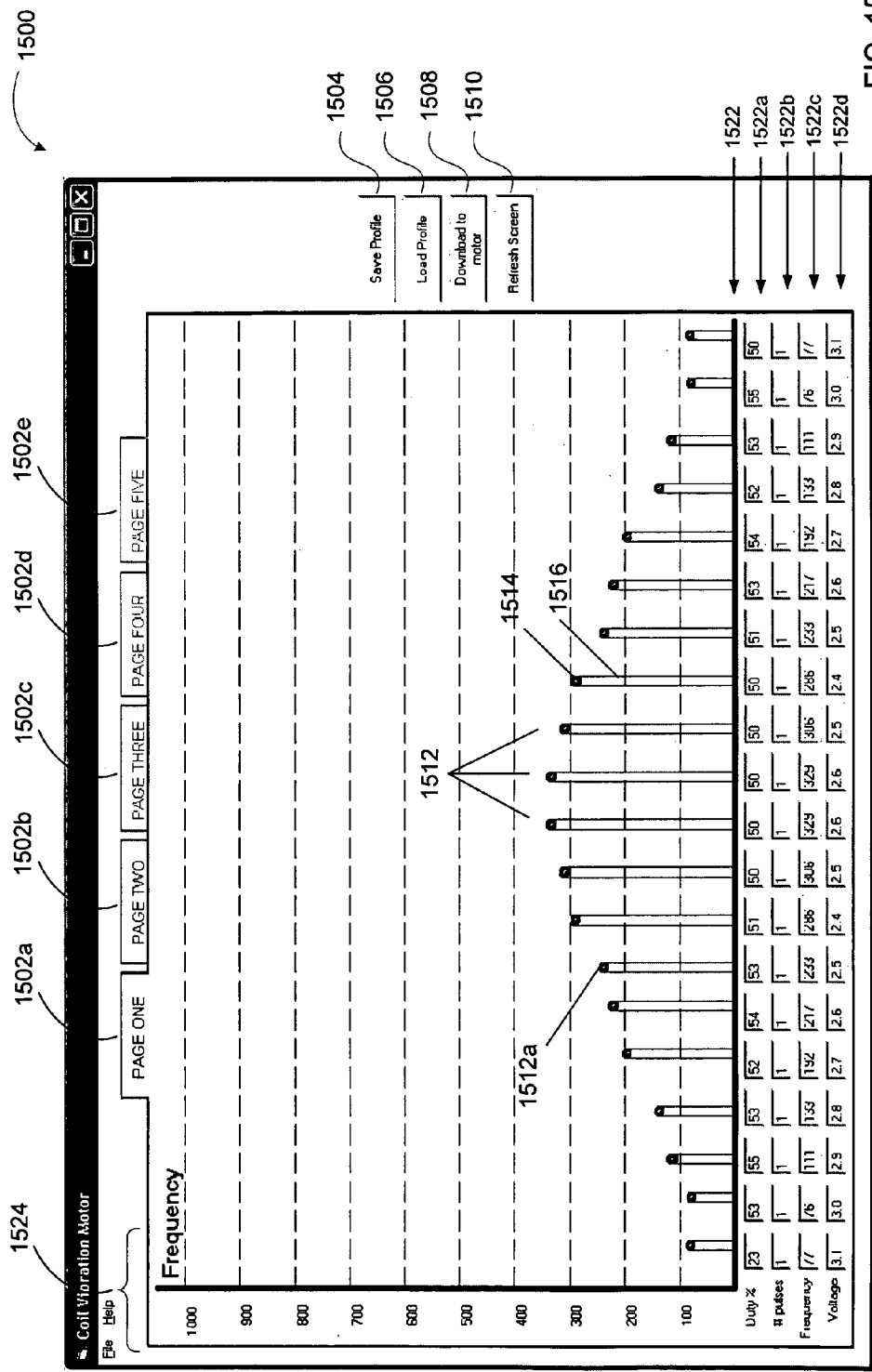
FIG. 15 illustrates a sample screen of a fan controller interface according to an embodiment of the present invention.

Referring now to FIG. 15, a screenshot is shown of an instantiation of a pulse configuration user interface 1500 in accordance with an embodiment of the present invention. The pulse configuration user interface 1500 comprises various elements displayed in a user interface window; e.g., a Microsoft® style window provided on PC 1306 to define the pulse train 1322a for driving the vibration motor 1302. In accordance with this embodiment of the present invention, the pulse train 1322a is defined by a series of pulse configuration points 1512 on the interface 1500. Each configuration point 1512 defines a segment of the pulse train 1322a, and the all of the configuration points defined by the user together constitute the a complete pulse train 1322a.

In this particular instantiation of the interface 1500, the user can specify up to 100 pulse configurations, although it is understood that many more or fewer pulse configurations can be provided to the user. Here, the 100 configuration points are divided among five configuration pages 1502a-1502e, each configuration display page being accessible by clicking on its associated tab graphic and displaying twenty pulse configurations. The figure shows "page one" being the active page.

Various control buttons 1504-1510 are provided to allow the user to manage the data and to manage the motor (e.g., 1304). A save profile button 1504 allows the user to save the configured pulses (referred to herein as a "profile") in a data file. Although not shown, it is understood that a suitable dialogue box can be presented to allow the user to name the file, specify the location of the file, and so on. A load profile button 1506 performs the opposite function, namely to allow the user to access a profile of pulses from a file and to display them on the pulse configuration interface 1500. The download button 1508 will be discussed in more detail below. A refresh button 1510 causes the interface 1500 to update in order to reflect changes made by the user.

The configuration page (e.g., 1502a) displays a series of pulse configuration points 1512 along a horizontal axis 1522 and a vertical axis 1524. The vertical axis 1524 displays a range of frequencies in pulses per second. In another embodiment, the "Frequency" legend can be replaced with a dropdown menu so that the vertical axis 1524 can be redisplayed by the user to represent duty cycle, number of pulses, frequency, or voltage.

Each increment on the horizontal axis 1522 corresponds to a configuration point. To configure the pulse(s) comprising a configuration point, the horizontal axis 1522 is associated with multiple units of measurement for each point. A row of input boxes 1522b allows the user to specify the number of pulses that comprise a given configuration point. The screenshot shown in FIG. 15 happens to show that each configuration point (e.g., 1512a) comprises one pulse. However, in an instantiation of this embodiment of the present invention, a configuration point can be defined to comprise 50,000 pulses.

A row of input boxes 1522a corresponding to each configuration point (e.g., 1512a) allows the user to specify the duty cycle for the pulse(s) defined by the configuration point. A row of input boxes 1522c allows the user to specify, for each configuration point, the frequency of the pulses in units of pulses per second, which essentially defines a pulse period (T). A row of input boxes 1522d specifies the amplitude of the pulse(s) for each configuration point. Thus, for example, the segment of the pulse train 1322a that is defined by configuration point 1512a comprises one pulse. The one pulse has an amplitude of 3.1 Vdc. The one pulse has a period of 1/77 of a second (approx. 13 mS) with a duty cycle of 23%. Though not illustrated, if a configuration point is defined by 2 or more pulses, then each pulse would be defined by the duty cycle setting, the frequency setting, and the voltage setting corresponding to that configuration point.

A graphical representation of each configuration point (e.g., 1512a) is plotted on frequency axis 1324 to correspond to the user-defined frequency value for that configuration point. In the screenshot of FIG. 15, for example, each configuration point is represented by a large dot 1514 connected to a vertical bar 1516, the height of the vertical bar determined by the range of values of the vertical axis 1524 and by its corresponding frequency value. When the user enters the frequency value in the input box 1522c for a given configuration point the display of its graphical representation can be updated at the same time. Alternatively, display updating can be delayed until the user clicks on the refresh button 1510.

The user can also click on the graphical representation of a configuration point (e.g., large dot) and drag it in the vertical direction to graphically configure the frequency values of the configuration points. As the user drags the large dot, the value displayed in the corresponding input box 1522c can be updated as well. Alternatively, the input box can be updated when the user clicks on the refresh button 1510.

Using both input methods can be useful. For example, the user can easily make large adjustments to the configuration points of the pulse train, while manual entry in the input boxes would be suitable for fine tuning the pulse train.

The download button 1508 allows the user to program the microcontroller 1328 with the data received for the configuration points 1512. The data that is received is loaded into a header file. An example of a header file is shown in FIG. 16.

Figure 17:
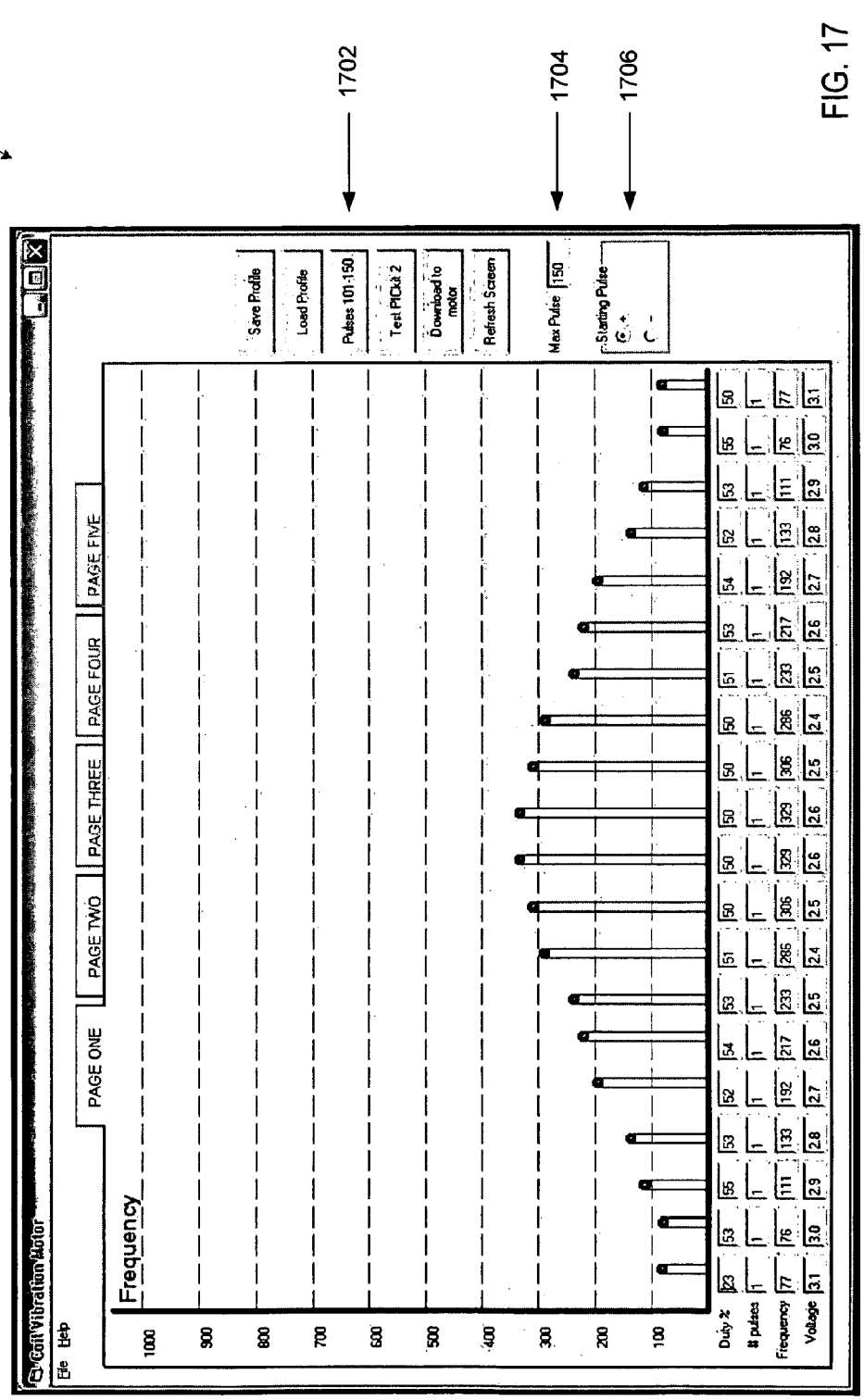
FIG. 17 illustrates a sample screen of a fan controller interface according to an embodiment of the present invention.

FIG. 17 shows a screenshot for a variation of the interface of FIG. 15. The interface 1700 shown in FIG. 17 includes additional controls for the user. In the particular instantiation of the present invention, the number of pulses defaults to 100 pulses. An additional pulses button 1702 allows the user to specify parameters for an additional 50 pulses. A Max Pulse input area 1704 allows the user to specify the maximum number of points to be programmed. A starting pulse selector 1706 allows the user to set the initial starting pulse to create a positive of a negative current. The polarity of the current sets the motor direction (clockwise rotation or counterclockwise rotation). With respect to a particular instantiation of the present invention, the radio buttons of the starting pulse selector 1706 specify which pair of switches (372/378, 376/374 in FIG. 3B) is turned on first.

Referring back to FIG. 10, the process shown in that figure applies to the design cycle for defining the configuration points of this embodiment of the present invention. At step 1002, the user (via a suitable interface such as shown in FIG. 15, for example) defines the configuration points. In step 1004, the configuration points are saved into a header file. The header file can then be compiled (step 1008) with source code for the microcontroller 1328 to produce a binary object. The binary object is then downloaded (step 1010) to the microcontroller 1328. Operation of the microcontroller 1328 will then control the voltage regulator 1324 and the H-bridge circuit 1322 to produce a commutation signal (pulse train 1322a) having the characteristics defined by the use via pulse configuration interface 1500.

FIG. 10A shows an alternative wherein the data is compiled (step 1008') separately from the microcontroller code. The resulting binary object is then downloaded (step 1010') to memory of the microcontroller. The microcontroller then controls the voltage regulator 1324 and the H-bridge circuit 1322 to produce a commutation signal (pulse train 1322*a*) accordingly.

The steps outlined in connection with FIGS. 10 and 10A for the foregoing embodiments of the present invention can be readily implemented in software on a suitably configured computer, such as a laptop computer. Typically, the software is provided on a suitable data recording medium such as a CD ROM and which is then installed on the computing device. The computing device then reads the CD ROM and installs the software onto the computing device.

The present invention allows the engineer or technician to fully customize pulse trains for optimized performance of a motor. The present invention reduces the expense of customizing pulse trains during the development cycle. A system according to the present invention can be combined with a design validation test to verify the motor is starting up and running normally. If a problem arises, for example, where the motor does not start up or run, the system can be used to help identify which pulses were the cause of the problem.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method for configuring a motor device comprising:
   displaying on a display device a graph representative of a plurality of configuration points, each configuration point defining one or more pulses;
   for each configuration point:
      displaying a first input field for receiving a duty cycle value to specify a duty cycle of said one or more pulses of said each configuration point;
      displaying a second input field for receiving an amplitude value to specify an amplitude of said one or more pulses of said each configuration point; and
      displaying a third input field for receiving a frequency value to specify a frequency of said one or more pulses of said each configuration point;
   receiving data in one or more of said first, second, or third input fields for at least some of said configuration points;
   generating download data from data values representing said configuration points; and
   sending said download data to a driver circuit of said motor,
   said driver circuit producing a commutation signal comprising a plurality of pulses based on said data values represented in said download data,
   coils of said motor being energized based on said commutation signal.

2. The method of claim 1 further comprising for each configuration point displaying a fourth input field for receiving a pulse count value to specify the number of said one or more pulses of said each configuration point.

3. The method of claim 1 wherein said motor is a vibration motor.

4. The method of claim 1 wherein said driver circuit comprises a microprocessor, said download data comprising executable program code.

5. The method of claim 4 wherein said driver circuit further comprises an H-bridge circuit controlled by said microprocessor to energize said coils of said motor.

6. The method of claim 4 wherein said driver circuit further comprises a memory, wherein said step of sending includes storing said download data to said memory.

7. The method of claim 1 wherein said drive circuit is a bipolar drive circuit or a unipolar drive circuit.

8. The method of claim 1 wherein said driver circuit comprises an I2C interface and said step of sending includes communicating with said driver circuit using an I2C communication protocol.

9. The method of claim 1 further comprising, subsequent to said steps of displaying, inputting previous data values stored in a data file and displaying said previous data values among said first, second, or third input fields.

10. A system for configuring a motor comprising:
    a display unit;
    a data processing unit; and
    program code configured to operate said data processing unit to:
       display a graph representative of a plurality of configuration points, each configuration point defining one or more pulses;
       for each configuration point:
          display a first input field to receive therein a duty cycle value to specify a duty cycle of said one or more pulses of said each configuration point;
          display a second input field to receive therein an amplitude value to specify an amplitude of said one or more pulses of said each configuration point; and
          display a third input field to receive therein a frequency value to specify a frequency of said one or more pulses of said each configuration point;
       receive data in one or more of said first, second, or third input fields for at least some of said configuration points;
       generate download data from data values representing said configuration points; and
       send said download data to a driver circuit of said motor,
    wherein a commutation signal produced by said driver circuit based on said data values represented in said download data is used to energize coils of said motor.

11. A method for configuring a motor comprising:
    receiving configuration data, said configuration data representative of parameters used to produce a commutation signal for driving said motor;
    displaying a plurality of graphic elements representative of said configuration data, said graphic elements comprising a plot of motor speed values versus duty cycle values;
    receiving user input that manipulates said plot of motor speed values versus duty cycle values to produce a manipulated plot, which represents changed configuration data;
    transforming said changed configuration data to produce download data; and
    communicating said download data to a driver circuit of said motor,
    said driver circuit producing a commutation signal in accordance with said download data to energize coils of said motor to operate said motor,
    said motor thereby being driven in accordance with said configuration data.

12. The method of claim 11 wherein said receiving configuration data includes receiving input data indicative of a change in position of one or more of said graphic elements, at least some of said configuration data are based on said input data.

13. The method of claim 11 wherein said receiving configuration data includes displaying one or more data input areas and receiving input data via said one or more data input areas.

14. The method of claim 11 wherein said configuration data is representative of a speed curve.

15. The method of claim 11 wherein said configuration data comprises pairs of a first duty cycle value and a first motor speed value and said graphic elements comprises a first plot of first motor speed values versus first duty cycle values.

16. The method of claim 15 further comprising:
operating said motor over a plurality of second duty cycle values;
for each second duty cycle value, determining a corresponding second motor speed value; and
displaying a second plot of second motor speed values versus said second duty cycle values.

17. The method of claim 11 wherein said commutation signal comprises a plurality of pulses, wherein said parameters define said pulses and include one or more of duty cycle, amplitude, or frequency.

18. A system for configuring a motor comprising:
a graphical display unit;
a data processing unit; and
program code configured to cause said data processing unit to:
receive input data representative of configuration data, said configuration data used to produce a commutation signal to drive said motor;
display a plurality of graphic elements representative of said configuration data, said graphic elements comprising a plot of motor speed values versus duty cycle values;
receive user input that manipulates said plot of motor speed values versus duty cycle values to produce a manipulated plot, which represents changed configuration data;
transform said changed configuration data to produce download data; and
communicate said download data to a driver of said motor,
said driver producing commutation signals in accordance with said download data to energize coils of said motor to operate said motor,
said motor thereby being controlled in accordance with said configuration data.

19. The system of claim 18 further comprising a user input device, wherein said input data is input from a user by manipulating said graphical elements using said input device.

20. The system of claim 18 wherein said program code is further configured to cause said data processing unit to:
input data from a data file, said data constituting previously stored configuration data; and
display said plurality of graphic elements representative of said previously stored configuration data.

21. The system of claim 18 wherein said program code is further configured to cause said data processing unit to store said configuration data to a data to a file.

22. The system of claim 18 wherein said configuration data is compiled with a source code compiler to transform said configuration data to produce said download data.

23. The system of claim 18 wherein said driver comprises a microprocessor and said download data comprises data readable by said microprocessor.

24. A software product comprising a non-transitory computer-readable storage medium having stored thereon program code, said program code configured to cause a data processing device to perform steps of:
receiving configuration data, said configuration data representative of parameters used to produce a commutation signal for driving a motor;
displaying a plurality of graphic elements representative of said configuration data, said graphic elements comprising a plot of motor speed values versus duty cycle values;
receiving user input that manipulates said plot of motor speed values versus duty cycle values to produce a manipulated plot, which represents changed configuration data;
transforming said changed configuration data to produce download data; and
communicating said download data to a driver of said motor,
said driver producing commutation signals in accordance with said download data to energize coils of said motor to operate said motor,
said motor thereby being controlled in accordance with said configuration data.

* * * * *